(12) United States Patent
Kawano

(10) Patent No.: US 11,986,957 B2
(45) Date of Patent: May 21, 2024

(54) MOVING ROBOT, MOVING ROBOT CONTROL METHOD AND PROGRAM THEREFOR

(71) Applicant: NIPPON TELEGRAPH AND TELEPHONE CORPORATION, Tokyo (JP)

(72) Inventor: Hiroshi Kawano, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 183 days.

(21) Appl. No.: 17/272,255

(22) PCT Filed: Aug. 8, 2019

(86) PCT No.: PCT/JP2019/031291
§ 371 (c)(1),
(2) Date: Feb. 26, 2021

(87) PCT Pub. No.: WO2020/045022
PCT Pub. Date: Mar. 5, 2020

(65) Prior Publication Data
US 2021/0339386 A1    Nov. 4, 2021

(30) Foreign Application Priority Data
Aug. 29, 2018    (JP) ................. 2018-160144

(51) Int. Cl.
*B25J 9/16*    (2006.01)
(52) U.S. Cl.
CPC .......... *B25J 9/1617* (2013.01); *B25J 9/1602* (2013.01)

(58) Field of Classification Search
CPC ............... B25J 9/1617; B25J 9/1602; G05B 2219/40302; G05B 2219/40274; G05B 2219/31075
See application file for complete search history.

(56) References Cited

U.S. PATENT DOCUMENTS 6,636,781 B1 * 10/2003 Shen ................ B08B 9/045
703/2
2017/0288976 A1 * 10/2017 Wang .................. A63H 33/062

OTHER PUBLICATIONS

Assume Definition & Meaning—Merriam-Webster.pdf (Assume Definition & Meaning—Merriam-Webster, https://www.merriam-webster.com/dictionary/assume, Oct. 20, 2022, pp. 1-7) (Year: 2022).*

(Continued)

*Primary Examiner* — Bao Long T Nguyen

(57) ABSTRACT

Provided is a control technique that enables a time required for platoon control operations to be shortened. A mobile robot includes, for example, a position distance calculation instruction transmission unit 1, a position distance calculation instruction transfer unit 2, a reply position distance calculation instruction transmission unit 3, a direction storage unit 4, a reply position distance calculation instruction transfer unit 5, an operation clock time announcement instruction transmission unit 6, an operation clock time announcement instruction transfer unit 7, a first moving unit 8, a movement start instruction transmission unit 9, a movement start instruction transfer unit 10, a second moving unit 11, a third moving unit 12, a determination unit 13, a fourth moving unit 14, a fifth moving unit 15, a waiting instruction transmission unit 16, and a waiting instruction transfer unit 17.

9 Claims, 21 Drawing Sheets

(56) References Cited

OTHER PUBLICATIONS

Hiroshi Kawano (2015) "Complete Reconfiguration Algorithm for Sliding Cube-shaped Modular Robots with only Sliding Motion Primitive," 2015 IEEE/RSJ International Conference on Intelligent Robots and Systems (IROS 2015), Sep. 2015, pp. 3276-3283.

Fitch et al. (2003) "Reconfiguration Planning for Heterogeneous Self-Reconfiguring Robots," 2003 IEEE/RSJ International Conference Intelligent Robots and Systems, Oct. 2003, pp. 2460-2467.

* cited by examiner

MOVING ROBOT, MOVING ROBOT CONTROL METHOD AND PROGRAM THEREFOR

CROSS-REFERENCE TO RELATED APPLICATIONS

This application is a U.S. 371 Application of International Patent Application No. PCT/JP2019/031291, filed on 8 Aug. 2019, which application claims priority to and the benefit of JP Application No. 2018-160144, filed on 29 Aug. 2018, the disclosures of which are hereby incorporated herein by reference in their entireties.

TECHNICAL FIELD

The present disclosure relates to a technique for controlling actions of a plurality of robots. For example, the present disclosure relates to a robot collaborative control technique for obtaining an action plan for each of a plurality of robots to cause the robots to move in a collaborative manner from a platoon formation state at an initial position, avoid obstacles, and form a platoon at a target position.

BACKGROUND ART

In recent years, efficient control of multiple autonomous mobile robots has been studied intensively. There are various tasks such as monitoring of locations where persons cannot enter and transport of articles, and techniques for efficiently causing multiple robots to form a platoon through cooperative operations have been required and studied intensively.

Among various kinds of robot platoon control, robot platoon control in which it is assumed that all robots move like an amoeba in a state in which the robots are in contact with each other has particular advantages in that it is possible to determine an absolute position of each robot from a relative positional relationship of the robots and that it is not necessary to additionally prepare equipment for measuring the positions, and research on such robots has also been conducted (see Non Patent Literatures 1 and 2, for example).

Non Patent Literature 1 discloses a method for achieving platoon control for transformation from any initial platoon formation state to a target platoon formation state on the assumption that all the robots have the same characteristics (homogeneous). Here, more efficient platoon control than before is achieved by causing eight robots to move as one unit.

Non Patent Literature 2 discloses a method for platoon control for transformation from a platoon with any shape to a platoon with another shape on the assumption that each rectangular robot has different characteristics (heterogeneous).

In order to achieve such efficient platoon formation of multiple robots, it is important to plan arrangement of each robot, an order of operations of each robot, and the like in advance. It is a matter of course that in such a plan, presence of obstacles, shapes of routes, and the like in an actual environment in which the plurality of robots operate have to be considered sufficiently.

CITATION LIST

Non Patent Literature

Non Patent Literature 1: Kawano, H., "Complete Reconfiguration Algorithm for Sliding Cube-shaped Modular Robots with only Sliding Motion Primitive", 2015 IEEE/RSJ International Conference on Intelligent Robots and Systems (IROS 2015), pp. 3276 to 3283, September 2015, Hamburg, Germany.

Non Patent Literature 2: R. Fitch, Z. Butler, D. Rus, "Reconfiguration Planning for Heterogeneous Self-Reconfiguring Robots", in Proc. 2003 IEEE/RSJ Int. Conf. Intelligent Robots and Systems, pp. 2460 to 2467, Las Vegas, NV, October, 2003.

SUMMARY OF THE INVENTION

Technical Problem

Non Patent Literature 2 achieves platoon control in a case in which each robot has different properties (heterogeneous), that is, a case in which a target position of each robot is identified, on the assumption of operations in a case in which the robots are in contact with each other. Such platoon control is suitable for an application in which robots with individually different roles, such as a robot with a camera mounted thereon and a robot with a wheel mounted thereon, are each disposed at an appropriate position in a robot platoon and the shape of the platoon is controlled, for example.

Non Patent Literature 1 assumes a homogeneous configuration, and the position of each robot after the transformation of a platoon is not guaranteed, and it is thus not possible to apply this to a problem of forming a platoon on the assumption of a heterogeneous configuration.

According to Non Patent Literature 2, although it is possible to perform formation of the platoon on the assumption of a heterogeneous configuration, it is necessary to perform switching positions of the robots after the transformation in a separate process. In other words, another platoon formation for repositioning each robot is performed such that the position of each robot conforms to a correct target position before the shape (platoon) is transformed into a target platoon regardless of the position of each robot to reposition the robots. Because it takes a significantly long time to perform the processing of switching the positions of the robots, there is a problem that a time required for platoon control is long as a whole.

In view of such current circumstances, an object of the present disclosure is to provide a control apparatus, a method, and a program that enable a time required for platoon control operations to be shortened.

Means for Solving the Problem

According to an aspect of the present disclosure, there is provided a mobile robot assumed to be composed of a plurality of robot units, in which there is a gap, around each of the plurality of robot units, where a robot composing another robot unit of the plurality of robot units is movable, a predetermined initial position and a predetermined target position are defined for each of the plurality of robot units, a set of a plurality of the predetermined initial positions and a set of a plurality of the predetermined target positions are assumed to be in contact with each other, one of positions that are included in the set of the plurality of the predetermined initial positions and are in contact with the set of the plurality of the predetermined target positions is defined as a connecting position, and the mobile robot is assumed to move from the predetermined initial position to the predetermined target position through the connecting position, the mobile robot including a position distance calculation instruction transmission unit configured to, in a case in which a corresponding robot unit from among the plurality of robot units is a robot unit j_root located at the connecting position, transmit, to an adjacent robot unit of the plurality of robot units, a position distance calculation instruction including a relative position from the connecting position and number of transmissions and transfers of the position distance calculation instruction, each of which is set to a predetermined initial value, a position distance calculation instruction transfer unit configured to, in a case in which the position distance calculation instruction is received, increment the number of transmissions and transfers included in the position distance calculation instruction, update the relative position included in the position distance calculation instruction in accordance with a direction in which the position distance calculation instruction is received, and transfer, only once, a position distance calculation instruction including the number of transmissions and transfers that is incremented and the relative position that is updated to an adjacent robot unit of the plurality of robot units other than a robot unit of the plurality of robot units that transmits the position distance calculation instruction, a reply position distance calculation instruction transmission unit configured to, in a case in which the position distance calculation instruction is received for the first time, transmit a reply position distance calculation instruction including the number of transmissions and transfers that is incremented and the relative position that is updated to a robot unit of the plurality of robot units that transmits the position distance calculation instruction, a direction storage unit configured to, in a case in which the position distance calculation instruction is received for the first time, store, as a root direction, a direction of a robot unit of the plurality of robot units that transmits the position distance calculation instruction, a reply position distance calculation instruction transfer unit configured to, in a case in which the reply position distance calculation instruction is received, transfer the reply position distance calculation instruction that is received in the root direction read from the direction storage unit, an operation clock time announcement instruction transmission unit configured to, in a case in which the corresponding robot unit from among the plurality of robot units is the robot unit j_root and a plurality of the reply position distance calculation instructions transmitted by all of a plurality of the robots are received, determine a movement start clock time for each of the plurality of robot units based on a position of each of the plurality of robot units based on a plurality of the relative positions included in the plurality of the reply position distance calculation instructions and transmit an operation clock time announcement instruction including the movement start clock time to an adjacent robot unit of the plurality of robot units, an operation clock time announcement instruction transfer unit configured to, in a case in which the operation clock time announcement instruction is received, transfer, only once, the operation clock time announcement instruction to an adjacent robot unit of the plurality of robot units, a first moving unit configured to, in a case in which a robot unit of the plurality of robot units that is to start a movement first receives the operation clock time announcement instruction, cause a robot composing the robot unit that is to start the movement first to move toward the connecting position, a movement start instruction transmission unit configured to, in a case in which a predetermined time elapses after a start of the movement, transmit, to an adjacent robot unit of the plurality of robot units, a movement start instruction directed to a robot unit of the plurality of robot units that moves next, a movement start instruction transfer unit configured to, in a case in which the movement start instruction is received, transfer, only once, the movement start instruction to an adjacent robot unit of the plurality of robot units, a second moving unit configured to, in a case in which a robot unit of the plurality of robot units that receives the movement start instruction, cause a robot composing the robot unit that receives the movement start instruction to move toward the connecting position, a third moving unit configured to, in a case in which a first robot unit of the plurality of robot units reaches the connecting position, acquire a target position of the first robot unit and a path to reach the target position of the first robot unit from the robot unit j_root and cause the first robot unit to move in accordance with the target position and the path that are acquired, a determination unit configured to determine whether there is a second robot unit of the plurality of robot units at an adjacent position to which the first robot unit is about to move, a fourth moving unit configured to, in a case in which there is the second robot unit at the adjacent position to which the first robot unit is about to move and the adjacent position to which the first robot unit is about to move is the target position of the first robot unit, cause the first robot unit to move to the adjacent position to which the first robot unit is about to move, a fifth moving unit configured to, in a case in which a corresponding robot unit from among the plurality of robot unit is the second robot unit, cause the second robot unit to move in accordance with a target position of the second robot unit and a path of the second robot unit after the first robot unit moves to the adjacent position to which the first robot unit is about to move, a waiting instruction transmission unit configured to, in a case in which the corresponding robot unit from among the plurality of robot units is the second robot unit, transmit a waiting instruction including a predetermined waiting time to an adjacent robot unit of the plurality of robot units, and a waiting instruction transfer unit configured to, in a case in which a robot unit of the plurality of robot units that receives the waiting instruction, stop a movement of the robot unit that receives the waiting instruction for the waiting time included in the waiting instruction and transfer, only once, the waiting instruction to an adjacent robot unit of the plurality of robot units.

According to an aspect of the present disclosure, there is provided a mobile robot assumed to be composed of a plurality of robot units, in which there is a gap, around each of the plurality of robot units, where a robot composing another robot unit of the plurality of robot units is movable, a predetermined initial position and a predetermined target position are defined for each of the plurality of robot units, a set of a plurality of the predetermined initial positions and a set of a plurality of the predetermined target positions are assumed to be in contact with each other, one of positions that are included in the set of the plurality of the predetermined initial positions and are in contact with the set of the plurality of the predetermined target positions is defined as a connecting position, and the mobile robot is assumed to move from the predetermined initial position to the predetermined target position through the connecting position, the mobile robot including a position distance calculation instruction transmission unit configured to, in a case in which a corresponding robot unit from among the plurality of robot units is a robot unit j_root located at the connecting position, transmit, to an adjacent robot unit of the plurality of robot units, a position distance calculation instruction including a relative position from the connecting position and number of transmissions and transfers of the position distance calculation instruction, each of which is set to a predetermined initial value, a position distance calculation instruction transfer unit configured to, in a case in which the position distance calculation instruction is received, increment the number of transmissions and transfers included in the position distance calculation instruction, update the relative position included in the position distance calculation instruction in accordance with a direction in which the position distance calculation instruction is received, and transfer, only once, a position distance calculation instruction including the number of transmissions and transfers that is incremented and the relative position that is updated to an adjacent robot unit of the plurality of robot units other than a robot unit of the plurality of robot units that transmits the position distance calculation instruction, a reply position distance calculation instruction transmission unit configured to, in a case in which the position distance calculation instruction is received for the first time, transmit a reply position distance calculation instruction including the number of transmissions and transfers that is incremented and the relative position that is updated to a robot unit of the plurality of robot units that transmits the position distance calculation instruction, a direction storage unit configured to, in a case in which the position distance calculation instruction is received for the first time, store, as a root direction, a direction of a robot unit of the plurality of robot units that transmits the position distance calculation instruction, a reply position distance calculation instruction transfer unit configured to, in a case in which the reply position distance calculation instruction is received, transfer the reply position distance calculation instruction that is received in the root direction read from the direction storage unit, an operation start instruction transmission unit configured to, in a case in which the corresponding robot unit from among the plurality of robot units is the robot unit j_root and a plurality of the reply position distance calculation instructions transmitted by all of a plurality of the robots are received, determine a movement start clock time for each of the plurality of robot units based on a position of each of the plurality of robot units based on a plurality of the relative positions included in the plurality of the reply position distance calculation instructions, and in a case in which a movement start clock time of a robot unit j_k of the plurality of robot units is reached on the assumption of k=1, . . . , K, transmit, to an adjacent robot unit of the plurality of robot units, an operation start instruction including the robot unit j_k, a robot unit j_move of the plurality of robot units that is located at a location that is able to be traced from the robot unit j_k and is in a position with the longest Manhattan distance from the connecting position, and path information from a position of the robot unit j_move to a position of the robot unit j_k, an operation start instruction transfer unit configured to, in a case in which the operation start instruction is received, transfer, only once, the operation start instruction to an adjacent robot unit of the plurality of robot units, a first moving unit configured to, in a case in which the operation start instruction is received for the robot unit j_move, cause the robot unit j_move to move to the position of the robot unit j_k, a second moving unit configured to, in regard to the robot unit j_k, cause the robot unit j_k to move toward the connecting position after the robot unit j_move moves to the position of the robot unit j_k, and a third moving unit configured to, in a case in which a robot unit of the plurality of robot units that reaches the connecting position, acquire a target position of the robot unit that reaches the connecting position and a path to reach the target position of the robot unit that reaches the connecting position from the robot unit j_root and cause the robot unit that reaches the connecting position to move in accordance with the target position and the path that are acquired.

Effects of the Invention

According to the present disclosure, it is possible to shorten the time required for platoon control operations.

DESCRIPTION OF EMBODIMENTS

Figure 1:
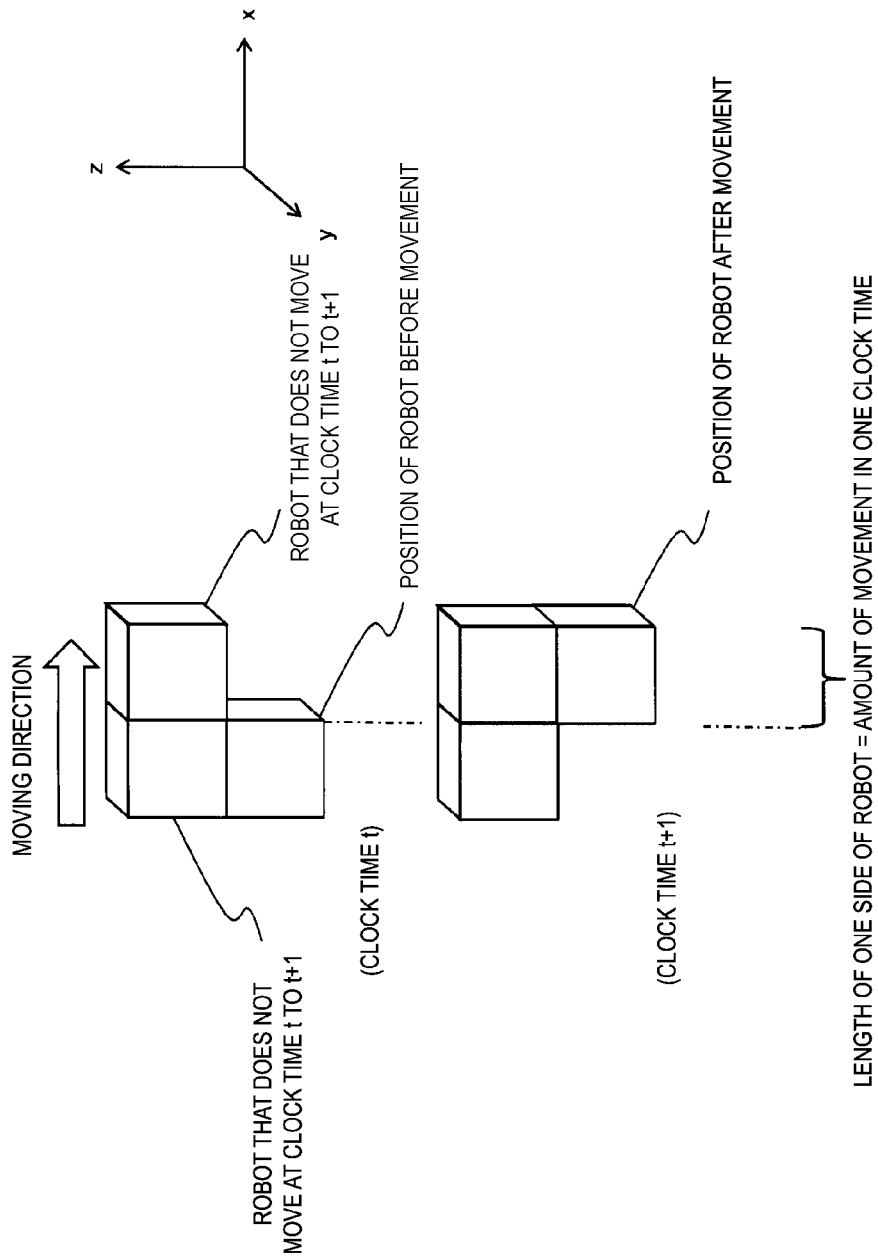
FIG. 1 is a diagram for explaining movement of robots.

Hereinafter, an embodiment according to the present disclosure will be described. Note that in the drawings used in the following description, constituents having the same function and steps of performing the same processing will be given the same reference signs, and duplicate descriptions are omitted.

Theoretical Background

First, a theoretical background of an action control system and a method will be described.

Problem Setting

A task of allowing multiple robots to perform, in a collaborative manner, platoon control of causing a platoon to move from any platoon formation as an initial platoon formation state to a target platoon formation state that is any platoon formation state that is a target while a state in which the robots are in contact with each other is maintained is achieved. For example, this is achieved on the assumption of control of robots with a cube shape capable of moving with sliding between surfaces that are in contact with each other, as exemplified in FIG. 1, for example. In the platoon control, transformation from a platoon at an initial position to a platoon at a target position is achieved through movement of a plurality of robots in a room sectioned by a wall (however, the wall is omitted in the drawing), as illustrated in FIG. 2.

Figure 2:
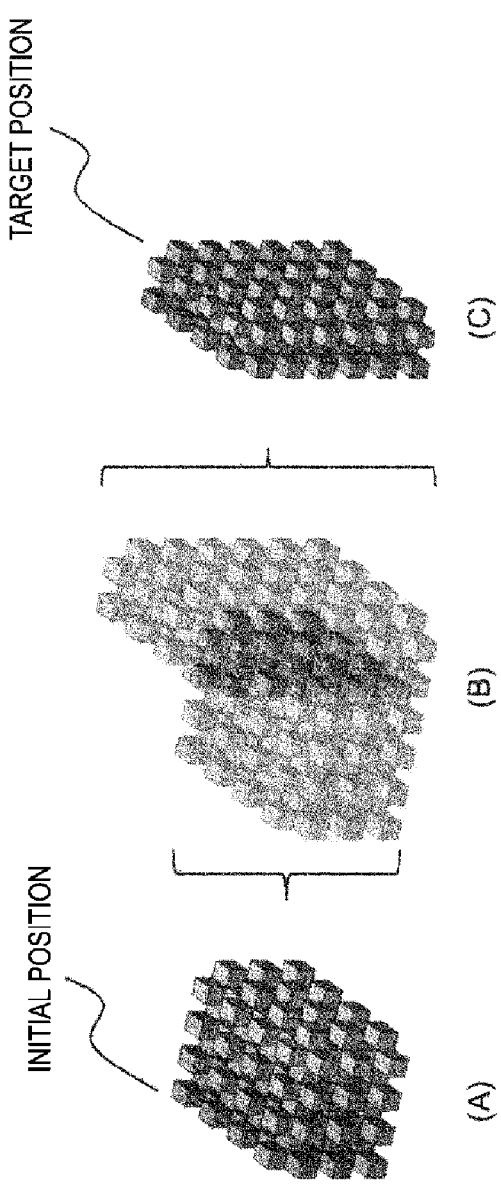
FIG. 2 is a diagram for explaining initial positions and target positions of the robots.

The robots are assumed to move while maintaining a state in which a different robot is present in one of six cells, vertical, horizontal, and height directions around the robots (hereinafter, also referred to as "upward, downward, left, right, forward, and backward directions") (one surface is shared with a different robot), as illustrated in FIG. 1, for example. This method has an advantage that it is possible to accurately measure the amount of movement in one operation by one robot itself moving a distance corresponding to the size of one robot. In addition, it is also possible to easily know the position of each robot in the entire group of robots by mutually measuring relative positions of adjacent robots that share one surface. Thus, a problem that the platoon collapses due to an error of the amount of movement of the robots is unlikely to occur, and it is possible to recognize the position without additionally preparing equipment for measuring positions in order to recognize the position of each robot. Also, it is possible to cause the plurality of robots to move at the same time as if the plurality of robots were coupled to each other. Note that the robots are assumed to be able to know whether different robots are present at adjacent positions, whether there is an obstacle, and whether the robots themselves are on target positions.

The number of robots that are in charge of tasks is assumed to be p (p≥12=4×3), and each robot is assumed to be able to move in directions of X-Y-Z axes in a three-dimensional space while sharing one or more surfaces with adjacent robots. In the present disclosure, because the robots achieve movement with each robot group composed of four robots as illustrated in the right diagram in FIG. 4 being a minimum unit (robot unit), the total number of robots is a multiple of 4.

The cubes in FIG. 1 represent the position of each robot. Only one robot can be present in each cube. Each robot is assumed to stand still in a case in which an obstacle or a different robot is present in a direction in which each robot is about to move. Note that a space with a cube shape in which the robot can be present will be referred to as a cell or a grid. In FIG. 2, the fully painted cells represent positions where robots are present. The positions where the robots are present in FIG. 2(A) represent a set of robots at initial positions (initial platoon formation state), and the positions where the robots are present in FIG. 2(C) represent a set of robots at target positions (target platoon formation state). As illustrated in FIG. 2(B), the set of the target positions and the set of the initial positions are in contact with each other. A region represented by the set of the target positions will also be referred to as a target platoon area. In this manner, each initial position and each target position are adjacent to another initial position and another target position in at least some of vertical, horizontal, and height directions, and each of the platoon shapes of the robot at the initial position and the target position is a lump of any shape.

Note that, in a case in which it is desired to achieve the target platoon formation state at a position that is not in contact with the initial platoon formation state, it is possible to eventually achieve transformation into the target platform formation by setting a plurality of intermediate platoon formation states that are adjacent to previous platoon formation states between the initial platoon formation state and the target platoon formation state, assuming platoon formation states that are temporally adjacent to each other as the initial platoon formation state and the target platoon formation state, and repeating the aforementioned platoon formation thereon.

Robot Coordinate Setting

When the position of each robot i (i represents a robot number; i=0, 1, 2, 3, . . . , p−1) is assumed to be (Xr[i], Yr[i], Zr[i]), the initial position is assumed to be (Xr0[i], Yr0[i], Zr0[i]), and the target position is assumed to be (Xre[i], Yre[i], Zre[i]), this problem can be defined as obtaining an action plan for a robot arranged at the initial position to move to the target position. A set of initial positions (Xr0[i], Yr0[i], Zr0[i]) of the robot is assumed to s, and a set of target positions (Xre[i], Yre[i], Zre[i]) is assumed to g.

Definition of Task Space

When i is a robot number, each state (a position and an action of the robot) of the robot i is expressed as a discrete value. A room is represented by a three-dimensional space in an orthogonal coordinate system of X, Y, and Z, and each position is expressed by values obtained by expressing the X axis, the Y axis, and the Z axis in a discretizing manner. In other words, the room (three-dimensional space) is sectioned by grids, and each position on the grid corresponds to a position. Also, "presence/absence" of an obstacle is set in advance for each position on the grid.

Definitions of Operations

For example, a subject of an action that is a robot is each robot arranged in a room. An action a of a robot i (i is a robot number) is one of a total of seven types of actions, namely standing still and moving in the vertical, horizontal, and height directions by one grid. On the assumption of a ε{0, 1, 2, 3, 4, 5, 6}, for example, it is assumed that 0: standing still, 1: moving in a positive X axis direction in the three-dimensional space by one grid, 2: moving in a positive Y axis direction in the three-dimensional space by one grid, 3: moving in a negative X axis direction in the three-dimensional space by one grid, 4: moving in a negative Y axis direction in the three-dimensional space by one grid, 5: moving in a positive Z axis direction in the three-dimensional space by one grid, 6: moving in a negative Z axis direction in the three-dimensional space by one grid.

Problems in Search Calculation

Such a state space in a task environment has the number of robots×the number of dimensions, namely three, and the number of selectable actions that are present is the number of actions (seven) of the robots to the power of the number of robots. When it is assumed that the number of robots is fifty, and the number of grids in the vertical, horizontal, and height directions in the room is twenty, the number of states is 20 to the power of 150, and the amount of resources required for search calculation is enormous. Further, the number of states increases by a factor of 8000 every time the number of robots increases by one. In a case in which a constraint condition that robots are in contact with each other is employed as described above in the section Problem Setting, it is necessary to perform search calculation in consideration of mutual movement of the robots, and it is thus difficult to achieve fundamental reduction of the amount of calculation, which is a large problem in a case in which a plurality of robots are used.

Features of Heterogeneous Platoon Control in Reference Literature 1

In heterogeneous platoon control in Reference Literature 1, an idea of void control is introduced as a measure to solve the aforementioned problem of a calculation load. Also, an idea of eight-cell robot units is also introduced in order to overcome the problem of platoon transformation as described in Problem Setting.

Figure 3:
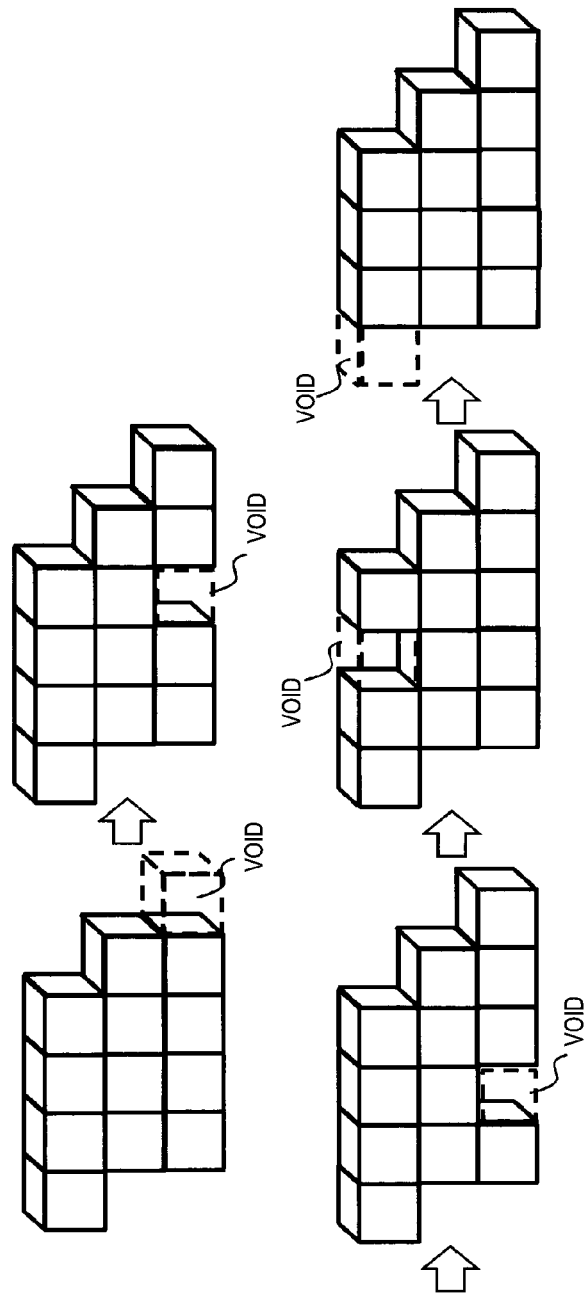
FIG. 3 is a diagram for explaining how a void moves.

First, void control will be described. The void described here is a gap generated at a position at which a certain robot was originally located after it moves to another position. In other words, the void is a virtual entity that moves in a direction opposite to a direction in which the robot moves. For such a group robot platoon formation problem, when operations of the plurality of robots are focused on, the amount of search calculation explodes. However, if a viewpoint is changed, and a motion of the void is focused on, it is possible to consider a problem of operation plans for multiple robots as an operation plan for a single void, and this is suitable for reduction of the load of the search calculation. A diagram illustrating how the void moves with movement of robots is illustrated in FIG. 3. However, since a fully filled eight-cell robot structure is employed in Reference Literature 1, it is necessary to intentionally generate the void in the structure for moving the robots, and there are thus many inconvenient points for moving of non-adjacent robots. It is thus difficult to perform the movement for causing each robot to reach a target position at the same time at the time of transformation of the overall shape of the platoon.

[Reference Literature 1] Kawano, H., "Tunneling-Based Self-Reconfiguration of Heterogeneous Sliding Cube-Shaped Modular Robots in Environments with Obstacles", 2017 IEEE International Conference on Robotics and Automation, pp. 825 to 832, May 2017, Singapore.

Introduction of Robot Units Having Gaps in Periphery

Figure 4:
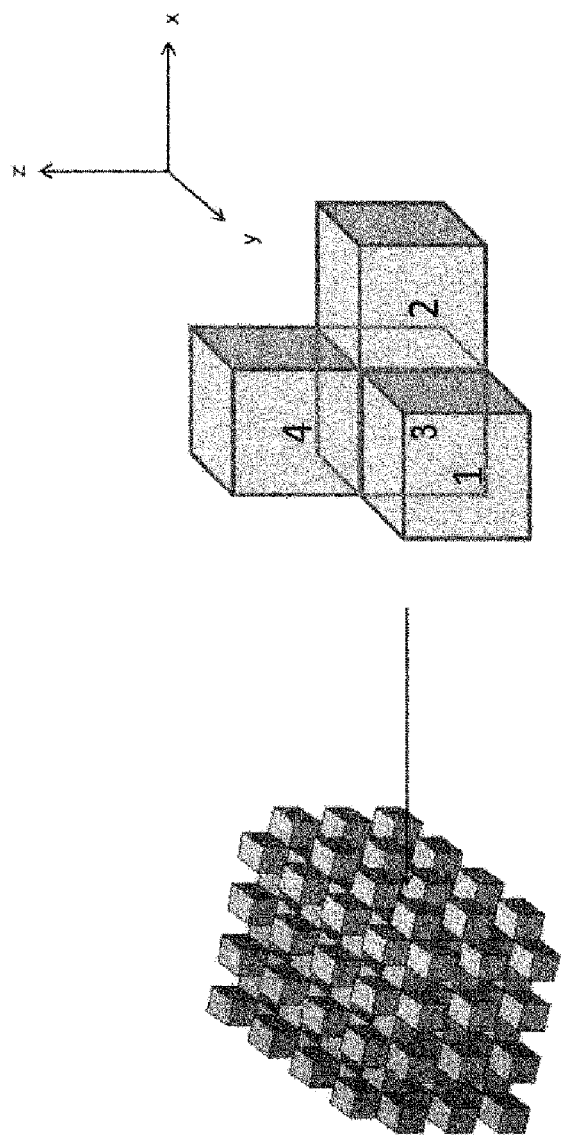
FIG. 4 is a diagram for explaining robot units.

Thus, according to the present disclosure, robot units having gaps in the periphery are defined as basic configuration elements of a platoon, the platoon is composed of a plurality of robot units connected to each other, and the robots are assumed to move while maintaining the robot units. As illustrated in FIG. 4, for example, four adjacent robots are assumed to be one unit (robot unit), and the robots move while maintaining the robot unit. In other words, every four robots compose one robot unit, and the four robots composing one robot unit move while maintaining an adjacent state. A cluster of robot units are controlled to mutually share at least one surface in each robot unit and move while keeping contact the surface with each other. In other words, it is assumed that platoon formation is performed while keeping connectivity. It is also assumed that four robots belonging to the same robot unit are the same (homogeneous). In other words, it is assumed that it does not matter which robot is located at which position in the same robot unit.

The robot units are not limited to the example in FIG. 4 and may be configured to satisfy the following conditions. In other words, each robot unit includes a structure (1) which is a partial structure in a space with a cube shape (hereinafter, this space will be referred to as a meta module) having a length M ($M \geq 2$; where the length of one robot is assumed to be 1) in each axial direction in a three-dimensional orthogonal coordinate system (in other words, the robot unit occupies a part of the meta module), (2) in which the number of robots included in the robot unit in the meta module is equal to the number of parts (that is, gaps) other than the robot unit in the meta module, and (3) in which M robots are adjacent to each other in each axial direction. For example, the robot unit illustrated as an example in FIG. 4 includes a structure (1) which is a partial structure of a meta module composed of a cube of a total of eight cells with the length $M=2$ in each axial direction, (2) in which the number of robots in the robot unit is four and is equal to the number of gaps in the meta module, which is also four, and (3) in which two robots are adjacent to each other in each axial direction.

The reason that such robot units move as one unit is that a plurality of gap spaces around each robot unit (inside the meta module) can be passed through by a robot belonging to another robot unit, and thus it is easy for robots belonging to the robot units that are not adjacent to go to and from each other. In addition, it is also easy to maintain connectivity when robots belonging to different robot units pass through the plurality of gap spaces in the periphery of each robot unit (inside the meta module). In other words, the reason is because this leads to reduction of a calculation load for considering connection between robots in determination of operations of each robot that has to weigh maintaining of a platoon form. In this manner, the present disclosure is characterized by achieving reduction of a calculation load by employing a configuration in which the robot units have gaps in the periphery as basic units. Although a case in which a structure including four robots illustrated in FIG. 4 is assumed to be a robot unit will be described as an example of a robot unit in the following description, similar effects can be obtained as long as the robot unit is configured so as to satisfy the aforementioned conditions (1) to (3) in a meta module with a size corresponding to $M^3$.

Here, it is assumed that a robot unit including four robots is a unit of one cell (in the present embodiment, the unit will also be referred to as a "cell unit" or a "position unit" below), and an initial state is defined as a set S, and a target state is defined as a set G in the states composed of sets of robot unit positions, in which one cell unit can be one state. Note that the set S may be referred to as a set S of initial positions or an initial position S below. Similarly, the set G may be referred to as a set G of target positions or a target position G. When the position of a certain robot unit j is assumed to be ($Xr\_u[j]$, $Yr\_u[j]$, $Zr\_u[j]$), here ($j=0, 1, 2, \ldots, j\_max-1$), and robots in the robot unit j are assumed to be j1, j2, j3, and j4, the following can be expressed.

$$Xr[j1] = 2 \times Xr\_u[j]$$

$$Yr[j1] = 2 \times Yr\_u[j] + 1$$

$$Zr[j1] = 2 \times Zr\_u[j]$$

$$Xr[j2] = 2 \times Xr\_u[j] + 1$$

$$Yr[j2] = 2 \times Yr\_u[j]$$

$$Zr[j2] = 2 \times Zr\_u[j]$$

$$Xr[j3] = 2 \times Xr\_u[j]$$

$$Yr[j3] = 2 \times Yr\_u[j]$$

$$Zr[j3] = 2 \times Zr\_u[j]$$

$$Xr[j4] = 2 \times Xr\_u[j]$$

$$Yr[j4] = 2 \times Yr\_u[j]$$

$$Zr[j4] = 2 \times Zr\_u[j] + 1$$

Here, j_max represents the total number of robot units, that is, j_max=p/4, and j corresponds to an ID for identifying the robot unit.

Note that the robot unit j to which each robot i belongs is not variable at any clock time in the platoon control. Also, the initial position of each robot unit j is assumed to be (Xr_u0[j], Yr_u0[j], Zr_u0[j]), and the target position is assumed to be (Xr_ue[j], Yr_ue[j], Zr_ue[j]).

Hereinafter, causing robots belonging to a robot unit to move may also be abbreviated as causing the robot unit to move.

In this manner, it is possible to transform a platoon in a smaller number of steps than the number of steps in the related art in which movement is controlled in robot units, each of which is composed of eight robots, by controlling movement in robot units, each of which is configured of four robots.

Heterogeneous Robot Platoon Control

A method for heterogeneous robot platoon control for causing each robot unit to move from a platoon at an initial position formed by the set S of each robot unit j at the initial position (Xr_u1[j], Yr_u0[j], Zr_u0[j]) to a platoon at a target position formed by the set G of each robot unit j at the target position (Xr_ue[j], Yr_ue[j], Zr_ue[j]) will be described below.

Figure 5:
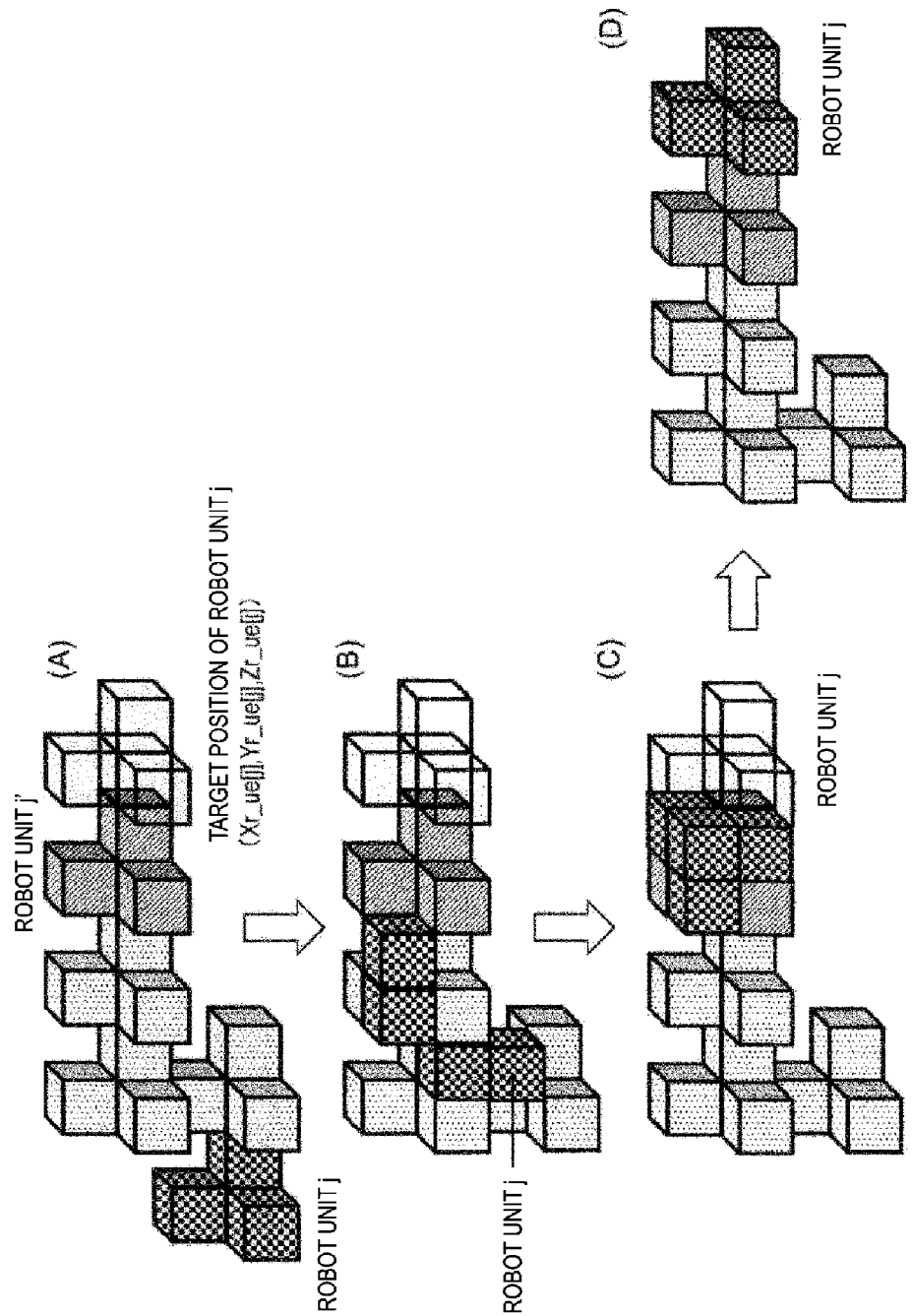
FIG. 5 is a diagram for explaining movement of robot units.

It is assumed that at a certain clock time, the target position (Xr_ue[j], Yr_ue[j], Zr_ue[j]) of the robot unit j remains as a gap, and four robots belonging to a robot unit j' are present in a position of a robot unit that is adjacent to the target position (Xr_ue[j], Yr_ue[j], Zr_ue[j]) (FIG. 5(A)). Since there is no non-connected location in the platoon configured of p robots, and four gaps through which the robots can pass are prepared in each robot unit, the four robots belonging to the robot unit j that is present at a certain position in the robot structure can move to the gaps in the robot unit j' through the gaps in the robot structure (FIGS. 5(B) and 5(C)). Then, it is also possible to form the basic shape of the robot unit j at the target position (Xr_ue[j], Yr_ue[j], Zr_ue[j]) by discharging the four robots belonging to the robot unit j from the robot position j' in a state in which the four gaps are filled with the robots belonging to the robot unit j to the adjacent position (Xr_ue[j], Yr_ue[j], Zr_ue[j]) (FIG. 5(D)).

Figure 6:
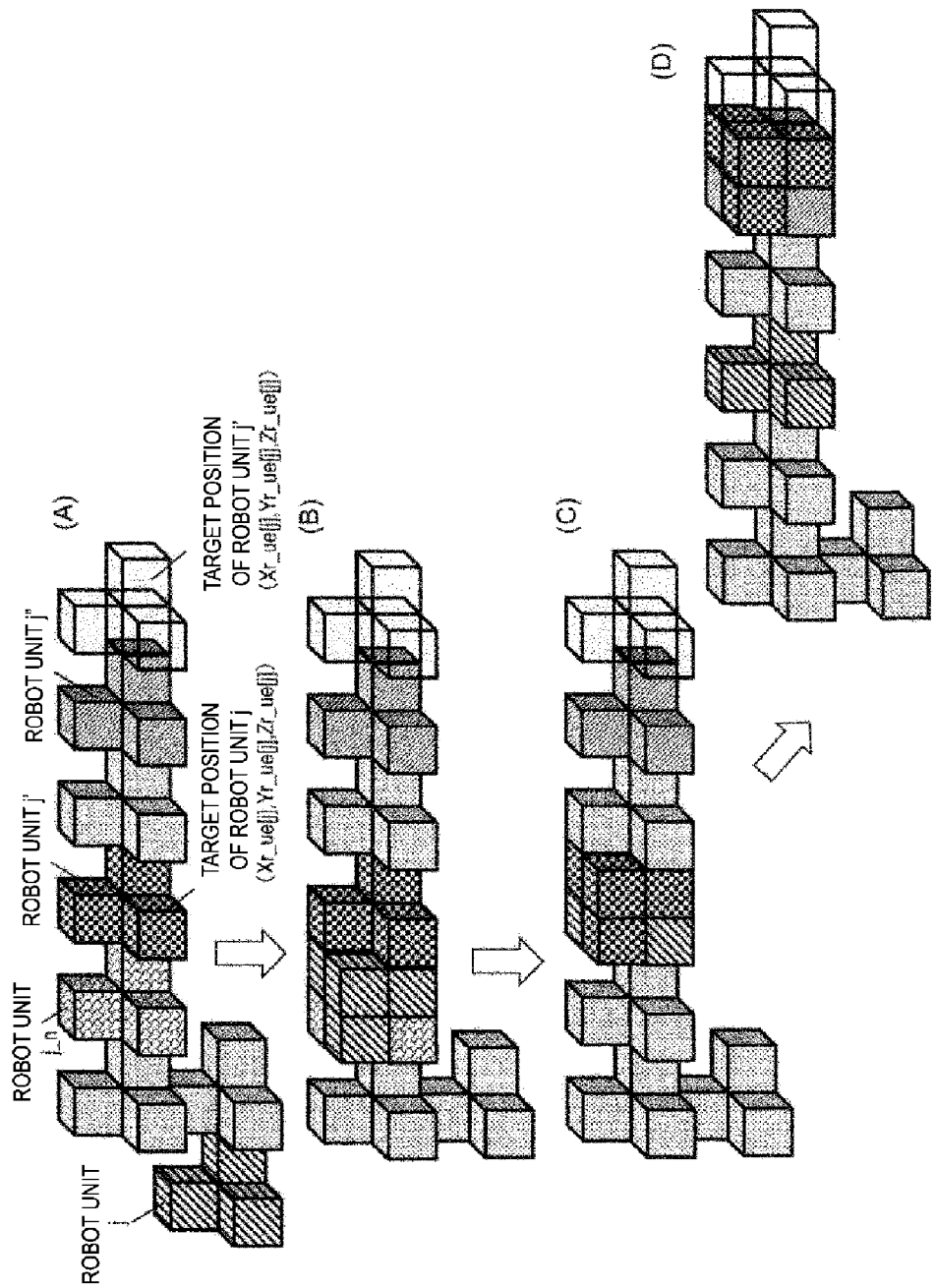
FIG. 6 is a diagram for explaining control for maintaining continuity of robot structures.

Here, what is to be noticed is a case in which the target position of the robot unit j has already been occupied by another robot unit j' at the timing at which the certain robot unit j is about to enter the set G at the target position and a case in which the original target position of the robot unit j' remains as a gap (FIG. 6(A)). In this case, it is necessary to cause the robot unit j to move to the position of the robot unit j', to kick out the robot unit j', and to further cause the robot unit j' to move to the original position, and as illustrated in FIG. 6, the four robots belonging to the robot unit j are caused to move to the four gap positions that are present in the periphery of the robot unit j_k (k=1, . . . , n) that is one of robot units j_n adjacent to the robot unit j' (FIG. 6(B)), and the positions of the robots belonging to the robot unit j' and the robots belonging to the robot unit j are then switched (FIG. 6(C)). Thereafter, the robot belonging to the robot unit j' is moved to a gap position around the robot unit j'' (FIG. 6(D)), and then the robot of the robot unit j' is moved to the target position.

If the aforementioned control is repeatedly performed until all the robot units reach the target positions, the hetero platoon control is completed. In this control, the operation of switching the positions of the robots that is necessary in the related art is replaced with the aforementioned operation of switching the positions of the robots belonging to the robot unit j' and the positions of the robots belonging to the robot unit j. According to the aforementioned method, the amount of movement necessary for all the robot units to reach the target positions from the initial positions are similar to the amount of movement in a case in which no switching is performed, and other movement is not needed. In other words, overall transformation of the platoon and the switching of the positions of the robots are performed at the same time by this method.

In this manner, it is possible to shorten the time required for the platoon control operations by performing the operation of transforming the overall shape and switching of the robot positions after the transformation at the same time rather than performing them in separate processes.

Here, although a method of setting the clock time at which the movement of each robot unit at the initial position S to the target position is started after the clock time at which the robot unit previously starting to move to the target position reaches the target position (the method in which the robot unit moves one by one) is employed in the related art, it is also possible to cause the plurality of robot units to move to the target positions at the same time by fully using the gaps obtained by the four-cell robot units in the robot structure. Here, as long as the robot unit that is about to start moving can start moving in a specific time after a start clock time at which the robot unit previously starts moving, it is possible to cause the time required for the overall transformation to be proportional to the number of robot units to the power of one.

A method to do this will be described. Here, it is assumed that the initial position S and the target position G are in contact with each other, the position of the robot unit in the initial position S in contact with the target position G is a connecting position Gate_S (X_Gate, Y_Gate, Z_Gate), and all the robot units enter the target position G via the connecting position Gate_S. As an order in which the robot units start moving, the robot units with longer Manhattan distance δ(j) from the connecting position Gate_S is caused to start moving with higher priority. Further, when the positions of the robot units are switched, all the robot units following the robot unit, the position of which is to be switched, stop operations for two time steps or more.

It is also assumed that a value of a control target unit that is about to start moving is δ(j), and a value at the initial position of the control target unit that has previously started moving is δ(j−1). Further, α is assumed to be a positive integer of two or more, and $t_w = \delta(j-1) - \delta(j) + \alpha$ is set. The control target unit that is about to start moving starts moving at a $t_w$ time step after the movement start clock time of the control target unit that has previously started moving. In other words, in a case in which the control target unit that is about to start moving has the same δ value as that of the initial position of the control target unit that has previously started moving, the control target unit that is about to start moving starts moving at an α time step after the movement start clock time of the control target unit that has previously started moving. In a case in which the δ value of the control target unit that is about to start moving is smaller than the value of the initial position of the control target unit that has previously started moving by one, the control target unit that is about to start moving starts moving at an α+1 time step after the movement start clock time of the control target unit that has previously started moving. By setting α=2, for example, each control target unit that moves simultaneously moves with a distance corresponding to just one control target unit from each other.

An embodiment of a mobile robot that achieves the aforementioned method using an algorithm based on a distributed control scheme and a control method for the mobile robot will be described below.

First Embodiment

Hereinafter, a mobile robot and a control method for the mobile robot according to the first embodiment will be described.

Figure 16:
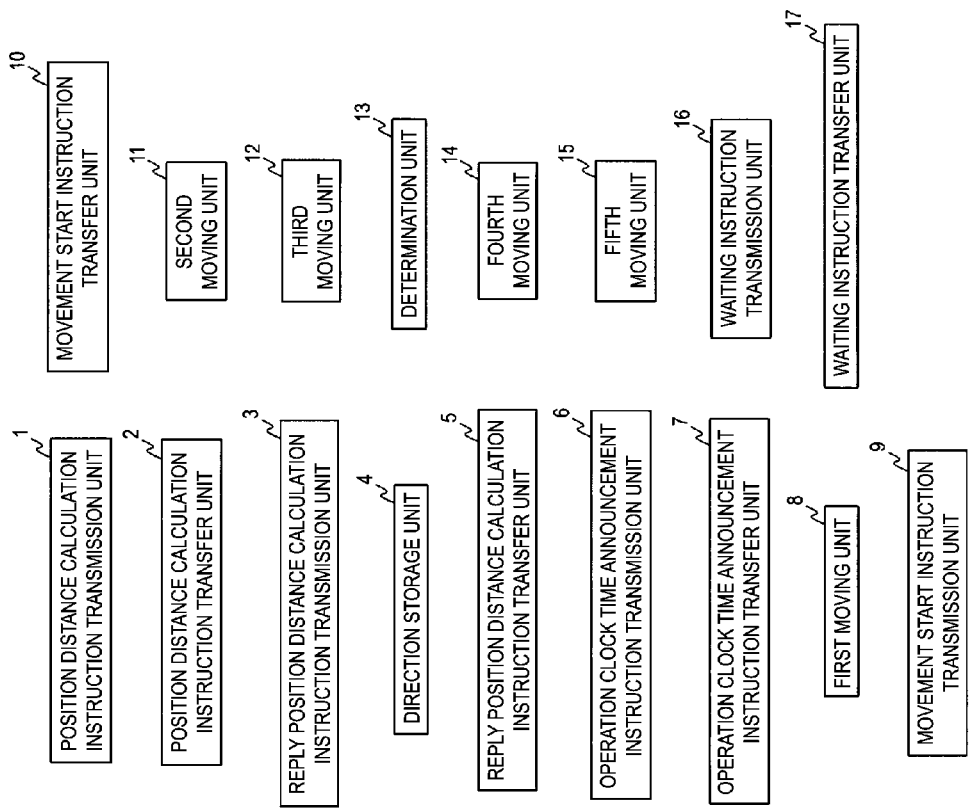
FIG. 16 is a block diagram for explaining a control apparatus according to a first embodiment.

As illustrated in FIG. 16, the mobile robot includes, for example, a position distance calculation instruction transmission unit 1, a position distance calculation instruction transfer unit 2, a reply position distance calculation instruction transmission unit 3, a direction storage unit 4, a reply position distance calculation instruction transfer unit 5, an operation clock time announcement instruction transmission unit 6, an operation clock time announcement instruction transfer unit 7, a first moving unit 8, a movement start instruction transmission unit 9, a movement start instruction transfer unit 10, a second moving unit 11, a third moving unit 12, a determination unit 13, a fourth moving unit 14, a fifth moving unit 15, a waiting instruction transmission unit 16, and a waiting instruction transfer unit 17.

Figure 17:
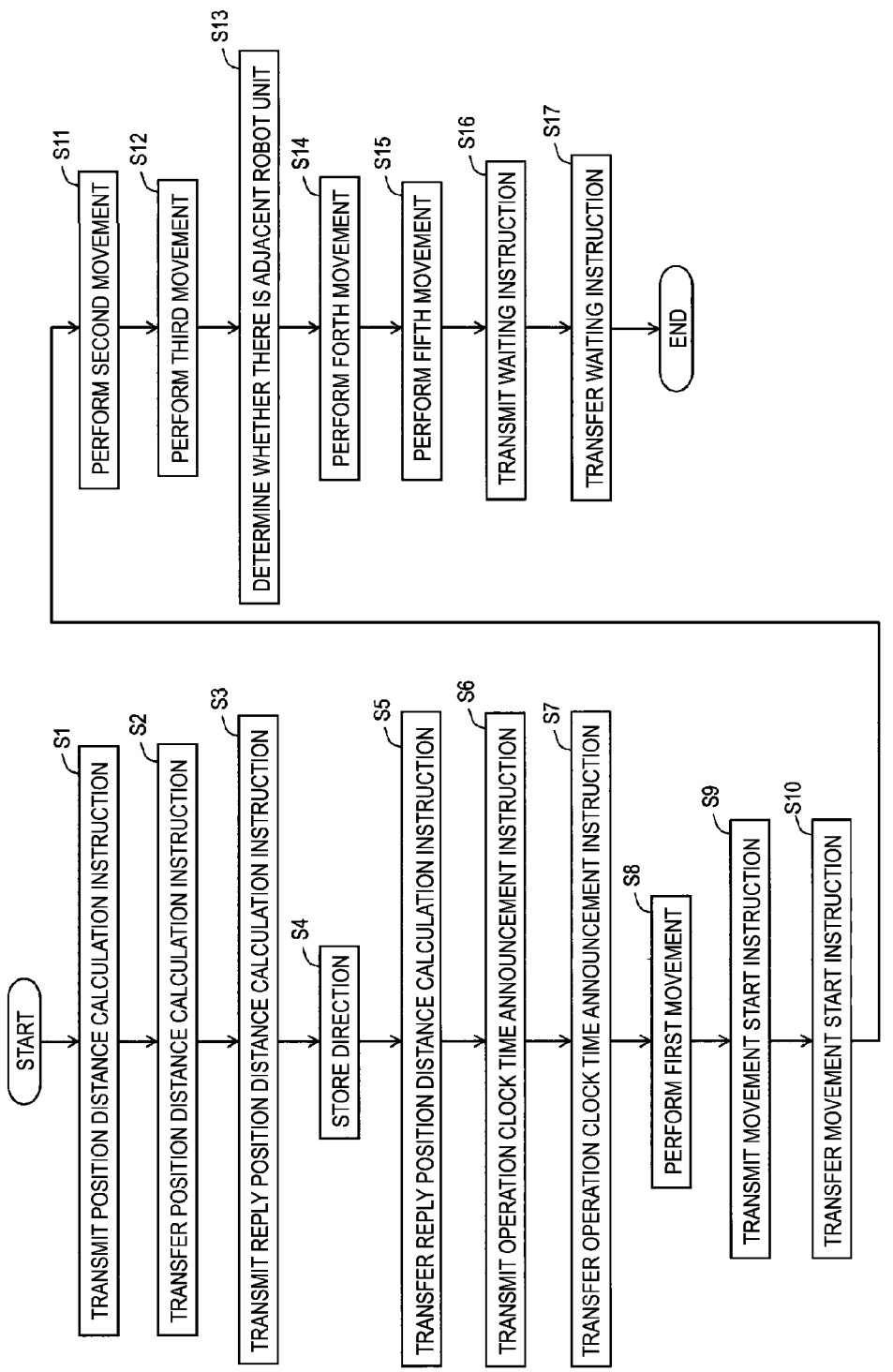
FIG. 17 is a flow diagram for explaining a control method according to the first embodiment.

The control method for the mobile robot is implemented by each part of the mobile robot performing processing in Step S1 to Step S17 described in FIG. 17 and below, for example.

The processing in Step S1 to Step S5 is processing for recognizing a platoon structure at the initial position S. The processing in Step S6 to Step S17 is processing for moving robot units.

First, a transformation start instruction is transmitted from a user to a robot unit j_root at the connecting position Gate_S. The transformation start instruction is assumed to include platoon form information that is information related to the target position G of each robot unit.

Position Distance Calculation Instruction Transmission Unit 1

In a case in which the robot that has received the transformation start instruction is the robot unit j_root at the connecting position Gate_S, the position distance calculation instruction transmission unit 1 transmits, to an adjacent robot unit, a position distance calculation instruction including a relative position from the connecting position and the number of transmissions and transfers of the position distance calculation instruction, each of which is set to a predetermined initial value (Step S1).

Hereinafter, the position distance calculation instruction may be described as a position distance calculation instruction MANHATTAN_COM, the relative position may be described as a relative position (Xr, Yr, Zr), and the number of transmissions and transfers may be described as the number of transmissions and transfers N_manhattan.

For example, the initial value of the relative position (Xr, Yr, Zr) is (0, 0, 0), and the initial value of the number of transmissions and transfers N_manhattan is 0.

Position Distance Calculation Instruction Transfer Unit 2

In a case in which the robot unit has received the position distance calculation instruction, the position distance calculation instruction transfer unit 2 increments the number of transmissions and transfers included in the position distance calculation instruction, updates the relative position included in the position distance calculation instruction in accordance with a direction in which the position distance calculation instruction has been received, and transfers, only once, a position distance calculation instruction including the incremented number of transmissions and transfers and the updated relative position to an adjacent robot unit other than the robot unit that has transmitted the position distance calculation instruction (Step S2).

Note that the position distance calculation instruction transfer unit 2 does not transfer the instruction to the robot unit that has transmitted the position distance calculation instruction MANHATTAN_COM to the position distance calculation instruction transfer unit 2 itself. In this manner, it is possible to prevent the position distance calculation instruction MANHATTAN_COM from being unlimitedly transmitted and received many times in the robot structure.

Reply Position Distance Calculation Instruction Transmission Unit 3

In a case in which the robot unit has received the position distance calculation instruction for the first time, the reply position distance calculation instruction transmission unit 3 transmits a reply position distance calculation instruction including the incremented number of transmissions and transfers and the updated relative position to the robot unit that has transmitted the position distance calculation instruction (Step S3).

Hereinafter, the reply position distance calculation instruction may be described as a reply position distance calculation instruction RETURN_MANHATTAN_COM.

The value of the number of transmissions and transfers N_manhattan when the position distance calculation instruction MANHATTAN_COM has been received for the first time is the Manhattan distance of the robot unit from the robot unit j_root.

Direction Storage Unit 4

In a case in which the robot unit has received the position distance calculation instruction for the first time, the direction storage unit 4 stores, as a root direction, a direction of the robot unit that has transmitted the position distance calculation instruction (Step S4).

Thereafter, when each robot transmits some information to the robot unit j_root, the robot transmits the information in the direction of its own root.

Reply Position Distance Calculation Instruction Transfer Unit 5

In a case in which the robot unit has received the reply position distance calculation instruction, the reply position distance calculation instruction transfer unit 5 transfers the received reply position distance calculation instruction in the root direction read from the direction storage unit 4 (Step S5).

Each reply position distance calculation instruction eventually reaches the robot unit j_root by each robot that has received each reply position distance calculation instruction performing processing in Step S5.

Operation Clock Time Announcement Instruction Transmission Unit 6

In a case in which the robot unit is the robot unit j_root, and the reply position distance calculation instruction transmitted by all the robots has been received, the operation clock time announcement instruction transmission unit 6 determines a movement start clock time of each robot unit based on the position of each robot unit based on the relative position included in the reply position distance calculation instruction and transmits an operation clock time announcement instruction including the movement start clock time to an adjacent robot unit (Step S6).

For example, the operation clock time announcement instruction transmission unit 6 recognizes the Manhattan distance of each robot unit and determines an order in which each robot unit starts to perform an operation of moving to the target position G and a clock time at which moving is scheduled to be started among the robot units, in order from the longest Manhattan distance.

Hereinafter, the operation clock time announcement instruction may be described as an operation clock time announcement instruction START_TIME_COM.

The operation clock time announcement instruction START_TIME_COM includes information related to a clock time at which each robot unit starts moving.

Operation Clock Time Announcement Instruction Transfer Unit 7

In a case in which the robot unit has received the operation clock time announcement instruction, the operation clock time announcement instruction transfer unit 7 transfers, only once, an operation clock time announcement instruction to an adjacent robot unit (Step S7).

Hereinafter, the operation clock time announcement instruction may be described as an operation clock time announcement instruction START_TIME_COM.

The operation clock time announcement instruction START_TIME_COM includes information related to a clock time at which each robot unit starts moving.

In this manner, the operation clock time announcement instruction START_TIME_COM is propagated to each robot unit similarly to the position distance calculation instruction MANHATTAN_COM.

First Moving Unit 8

In a case in which the robot unit is a robot unit that starts moving first and has received the operation clock time announcement instruction, the first moving unit 8 causes the robot to move toward the connecting position (Step S8).

In this manner, the robot unit that starts moving first among the robot units that have received the operation clock time announcement instruction START_TIME_COM starts an operation of moving to the target position G passing through the connecting position Gate_S after receiving the operation clock time announcement instruction START_TIME_COM. Because the robot unit j_1 that starts moving first is the last to receive the instruction START_TIME_COM among all the robot units at this time, a reception failure of the instruction START_TIME_COM of other robot units does not occur in this method.

Figure 7:
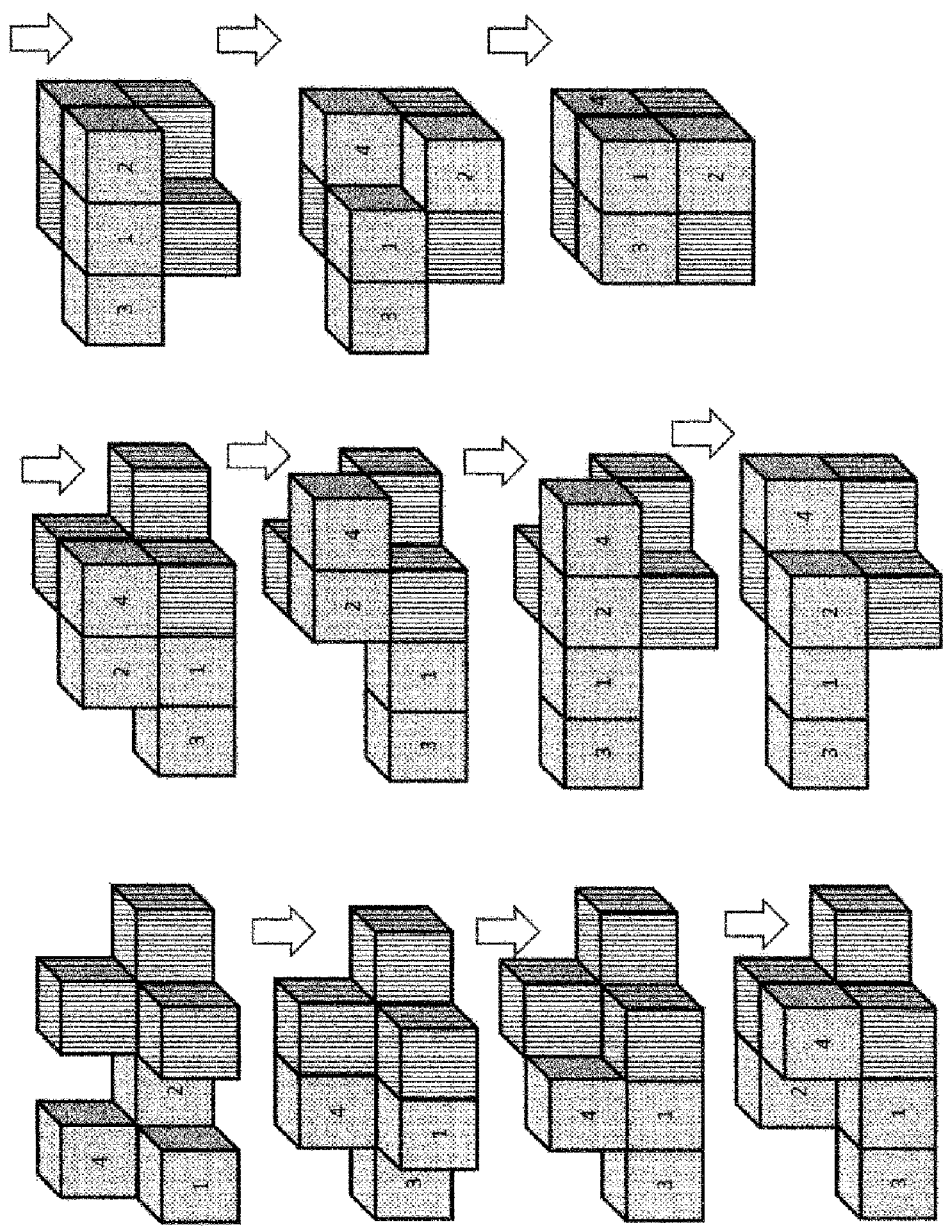
FIG. 7 is a diagram for explaining movement of robot units.
Figure 8:
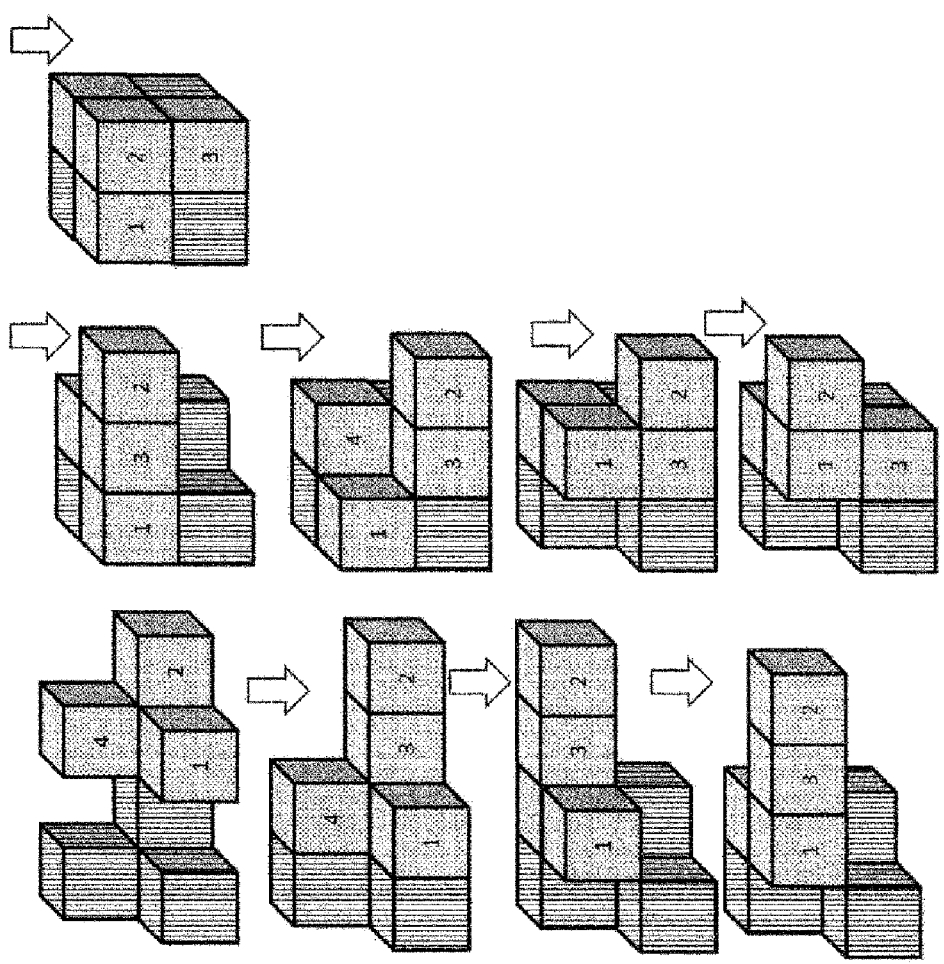
FIG. 8 is a diagram for explaining movement of robot units.
Figure 9:
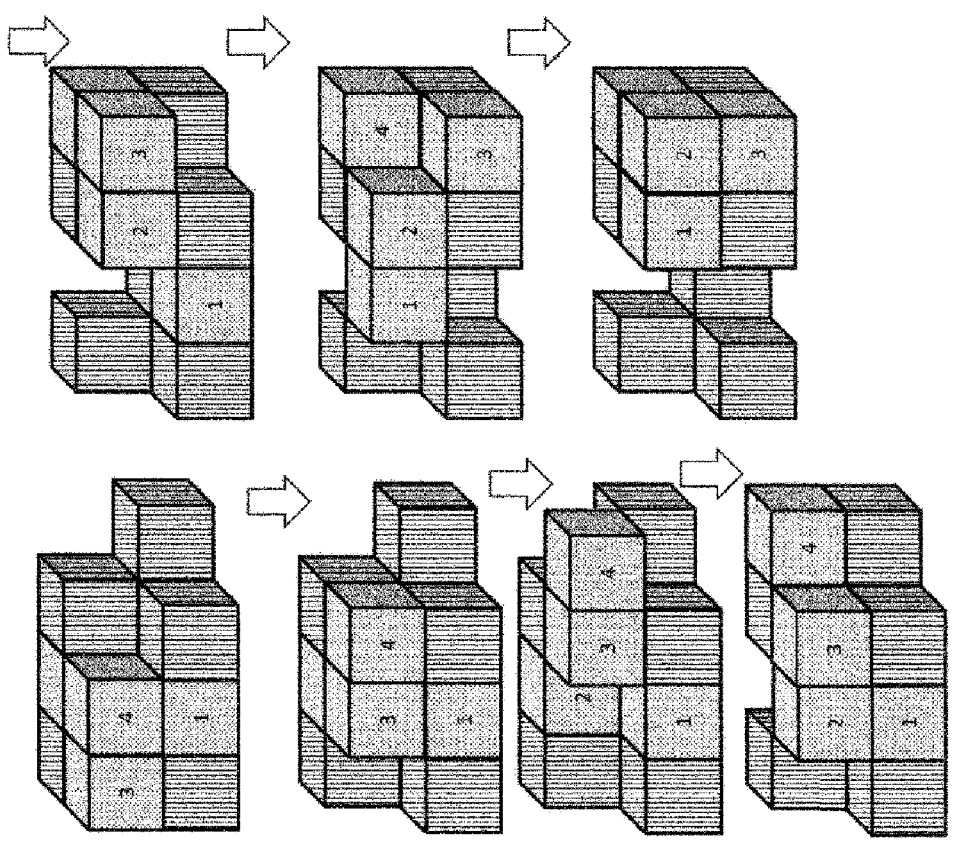
FIG. 9 is a diagram for explaining movement of robot units.
Figure 10:
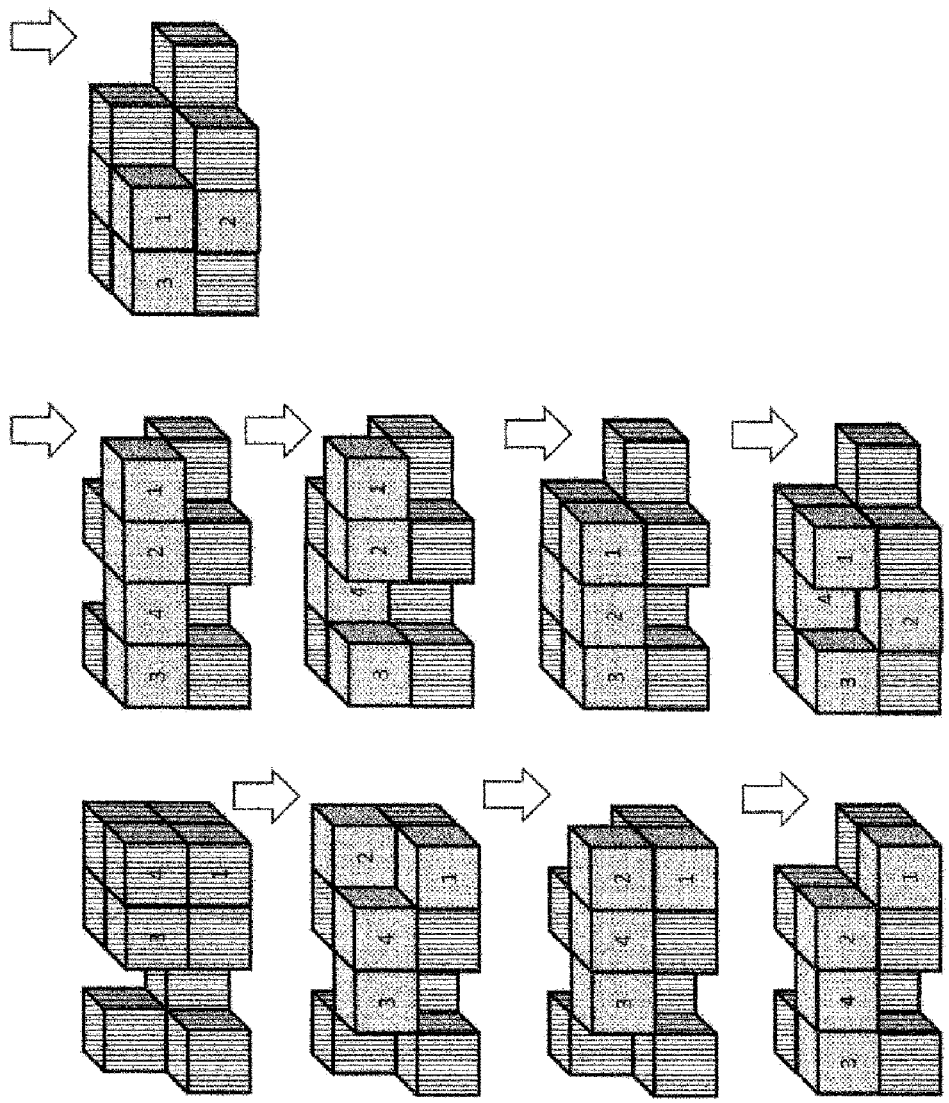
FIG. 10 is a diagram for explaining movement of robot units.

Note that the robot unit j_1 that has started moving first moves in the root direction through the operations illustrated in FIGS. 7 and 8. Thereafter, the robot unit j_1 transmits an instruction ASK_TO_ROOT_COM for asking the root direction to the robot units that compose the eight-cell robot unit together with the robot unit j_1 and knows the root direction through a reply instruction RETURN_TO_ROOT in response to the instruction ASK_TO_ROOT_COM. Then, the robot unit j_1 moves in the root direction. At this time, operations in FIGS. 9 and 10 are used. Thereafter, the robot unit j_1 repeats this until reaching the position (connecting position Gate_S) of the robot unit j_root.

Movement Start Instruction Transmission Unit 9

In a case in which a predetermined time has elapsed after the robot unit starts moving, the movement start instruction transmission unit 9 transmits a movement start instruction directed to the robot unit that moves next to an adjacent robot unit (Step S9).

Hereinafter, the movement start instruction may be described as a movement start instruction MOVE_STRAT_COM.

When a predetermined time (a time difference until the clock time at which the next robot unit starts moving) has elapsed after the robot unit j_1 starts moving, for example, the robot unit j_1 transmits the movement start instruction MOVE_START_COM to the robot unit j_2 that is scheduled to start moving to the target position G through the connecting position Gate_S next.

Movement Start Instruction Transfer Unit 10

In a case in which the robot unit has received the movement start instruction, the movement start instruction transfer unit 10 transfers, only once, the movement start instruction to an adjacent robot unit (Step S10).

The movement start instruction MOVE_START_COM is propagated to each robot unit similarly to the movement start instruction MANHATTAN_COM.

Second Moving Unit 11

In a case in which the robot unit has received the movement start instruction, the second moving unit 11 causes the robot to move toward the connecting position (Step S11).

For example, the robot unit j_2 that has received the movement start instruction MOVE_START_COM starts moving to the target position G through the connecting position Gate_S. Thereafter, when the predetermined time (the time difference until the clock time at which the next robot unit starts moving) elapses after the robot unit j_2 starts moving, the robot unit j_2 transmits the movement start instruction MOVE_STRAT_COM toward a robot unit j_3 scheduled to start moving to the target position G passing through the connecting position Gate_S next.

The processing in Step S9 to Step S12 is repeatedly performed until all the robot units at the initial position S start moving to the target position G passing through the connecting position Gate_S.

Note that each robot unit j_k (k=1, 2, 3, . . . , p/4) that has started moving first moves in the root direction through the operations illustrated in FIGS. 7 and 8, for example. Thereafter, each robot unit transmits the instruction ASK_TO_ROOT_COM for asking the root direction to the robot units composing the eight-cell robot unit together with the robot unit itself, for example, and knows the root direction through the reply instruction RETURN_TO_ROOT in response to the instruction ASK_TO_ROOT_COM. Then, the robot unit j_k moves in the root direction. At this time, operations in FIGS. 9 and 10 are used. Thereafter, the robot unit j_k repeats this until reaching the position (connecting position Gate_S) of the robot unit j_root.

Third Moving Unit 12

In a case in which the robot unit has reached the connecting position, the third moving unit 12 acquires the target position of the robot unit itself and a path to reach the target position of the robot unit itself from the robot unit j_root and causes the robot unit itself to move in accordance with the acquired target position and the path (Step S12).

For example, the third moving unit 12 of each robot unit j_k that has reached the connecting position Gate_S transmits a target position path acquisition instruction REQUEST_PATH_TO_GOAL_COM for requesting information related to the target position in its own G and an optimal path to get to the target position (on the assumption that all the robot unit positions in G before getting there are filled and the robot unit can pass therethrough) to the robot unit j_root, receives a reply target position path acquisition instruction RETURN_PATH_TO_GOAL_COM responded to the target position path acquisition instruction REQUEST_PATH_TO_GOAL_COM from the robot unit j_root, and then starts moving to the target position in its own G in accordance with the received path information.

Determination Unit 13

The determination unit 13 determines whether there is a different robot unit at an adjacent position to which the robot unit is about to move (Step S13).

For example, the robot unit j_k that has started moving to the target position in its own G transmits an adjacent robot unit checking instruction ASK_TARGET_EXIST_COM for asking whether a different robot unit has already been present in the direction in which the robot unit j_k is about to move now to a robot unit j_k' forming the eight-cell robot unit together with the robot unit j_k itself.

In this case, the robot unit j_k' replies with a reply adjacent robot unit checking instruction RETURN_TARGET_EXIST_COM for whether or not an adjacent robot unit is present in the direction in which the robot unit j_k is about to move, to the robot unit j_k.

In this manner, the determination unit 13 of the robot unit j_k can determine whether there is a different robot unit at the adjacent position to which the robot unit j_k is about to move.

In a case in which a different robot unit has already been present in the direction in which the robot unit j_k that has received the adjacent robot unit checking instruction RETURN_TARGET_EXIST_COM is about to move now and the position to which the robot unit j_k is about to move is not its own target position, the robot unit j_k moves through the operations in FIG. 9 or FIG. 10, for example.

Figure 13:
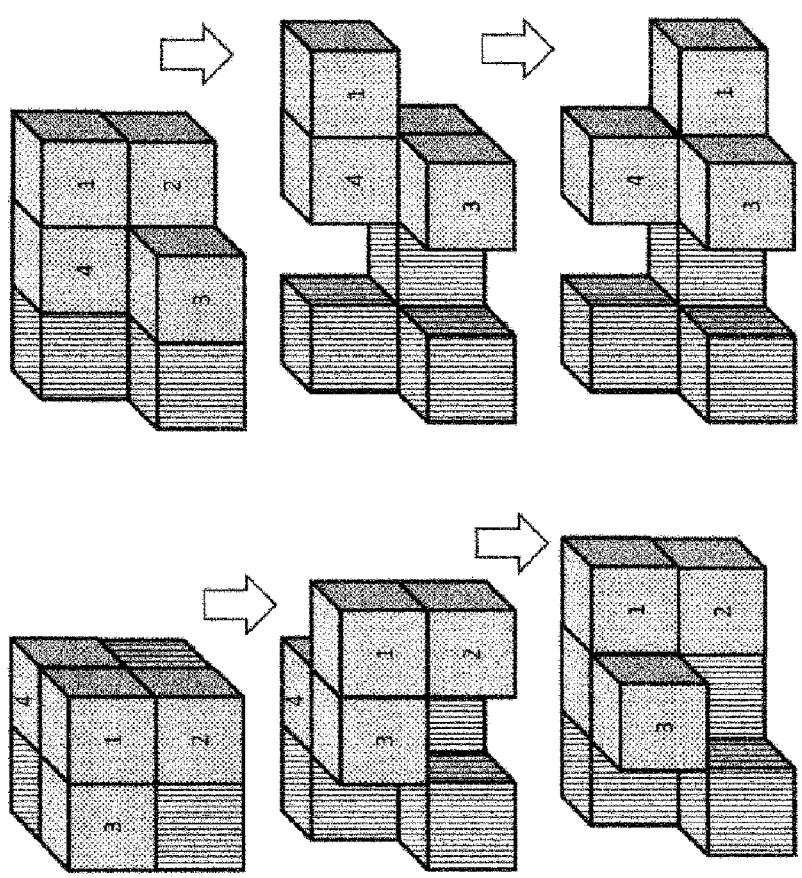
FIG. 13 is a diagram for explaining movement of robot units.
Figure 14:
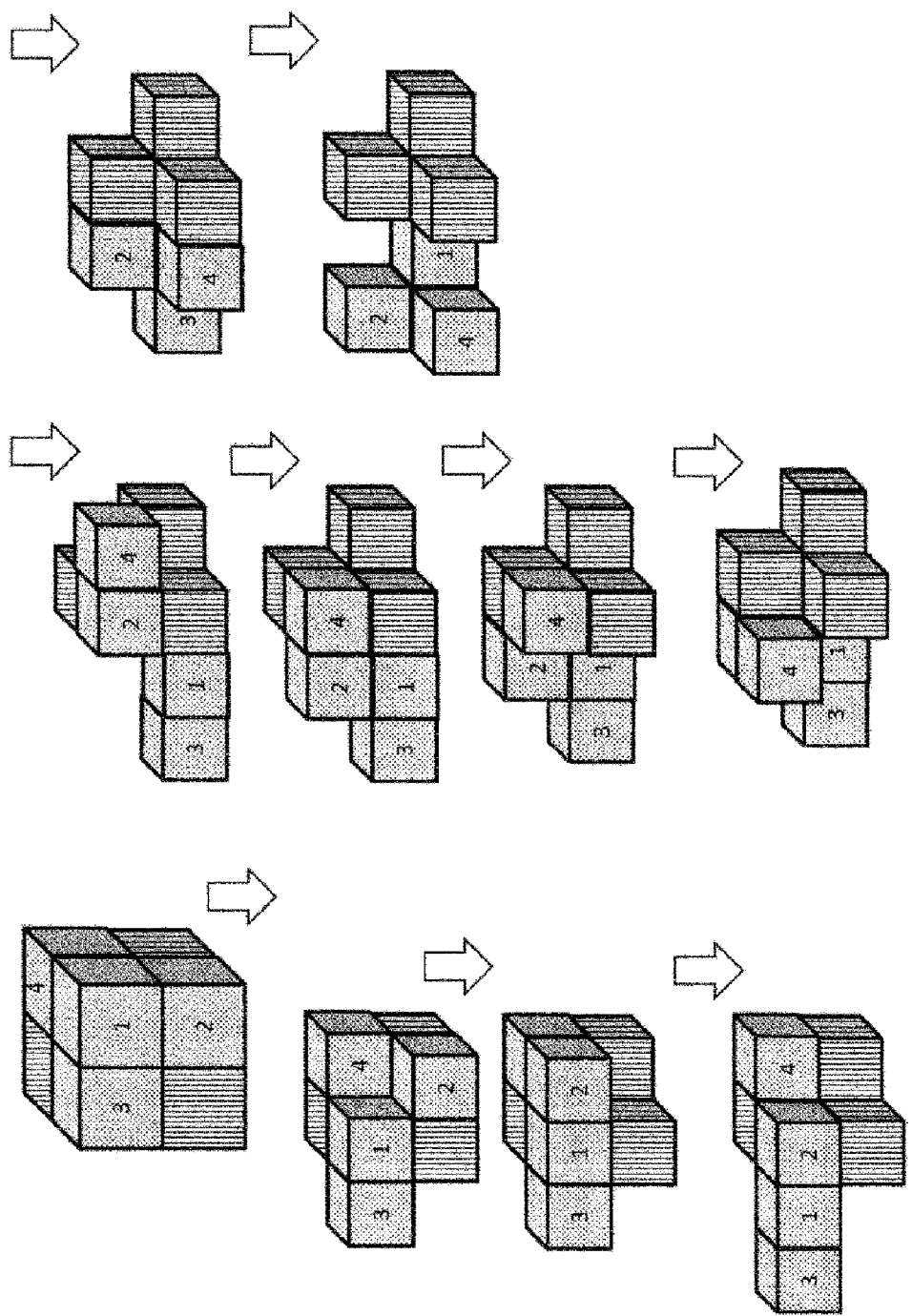
FIG. 14 is a diagram for explaining movement of robot units.

In a case in which no different robot unit has already been present in the direction in which the robot unit j_k that has received the adjacent robot unit checking instruction RETURN_TARGET_EXIST_COM is about to move now, the robot unit j_k moves through the operations illustrated in FIG. 13 or FIG. 14.

Fourth Moving Unit 14

In a case in which a different robot unit is present at the adjacent position to which the robot unit is about to move and the adjacent position to which the robot unit is about to move is the target position of the robot unit itself, the fourth moving unit 14 causes the robot unit itself to move to the adjacent position to which the robot unit is about to move (Step S14).

For example, in a case in which a different unit has already been present in the direction in which the robot unit j_k is about to move now, and in a case in which the position to which the robot unit j_k is about to move is its own target position, the fourth moving unit 14 of the robot unit j_k transmits an adjacent robot unit checking instruction ASK_GOAL_NEIGHBOR_COM for asking information related to whether a robot unit that is adjacent to the robot unit that has already been present in the direction in which the robot unit j_k is about to move now is present, to the robot unit j_k' composing the eight-cell robot unit together with the robot unit j_k itself. The robot unit j_k' transfers the adjacent robot unit checking instruction ASK_GOAL_NEIGHBOR_COM to the robot unit that is located at the target position of the robot unit j_k. The robot unit at the target position of the robot unit j_k that has received the adjacent robot unit checking instruction ASK_GOAL_NEIGHBOR_COM transmits a reply adjacent robot unit checking instruction RETURN_GOAL_NEIGHBOR_COM for replying with information related to whether a robot unit adjacent to the robot unit itself is present. The reply adjacent robot unit checking instruction RETURN_GOAL_NEIGHBOR_COM is transferred to the robot unit j_k via the robot unit j_k'.

Figure 11:
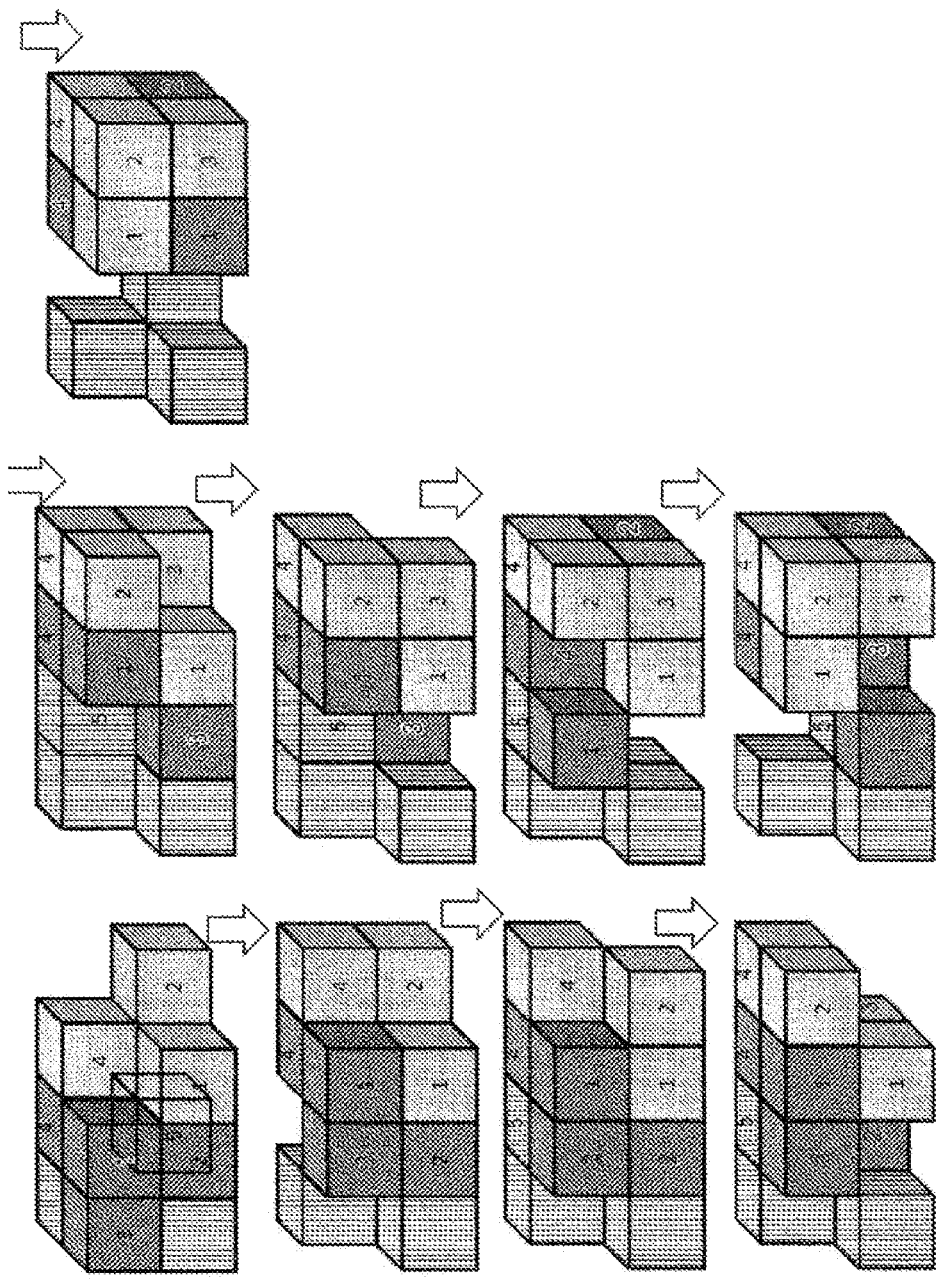
FIG. 11 is a diagram for explaining movement of robot units.
Figure 12:
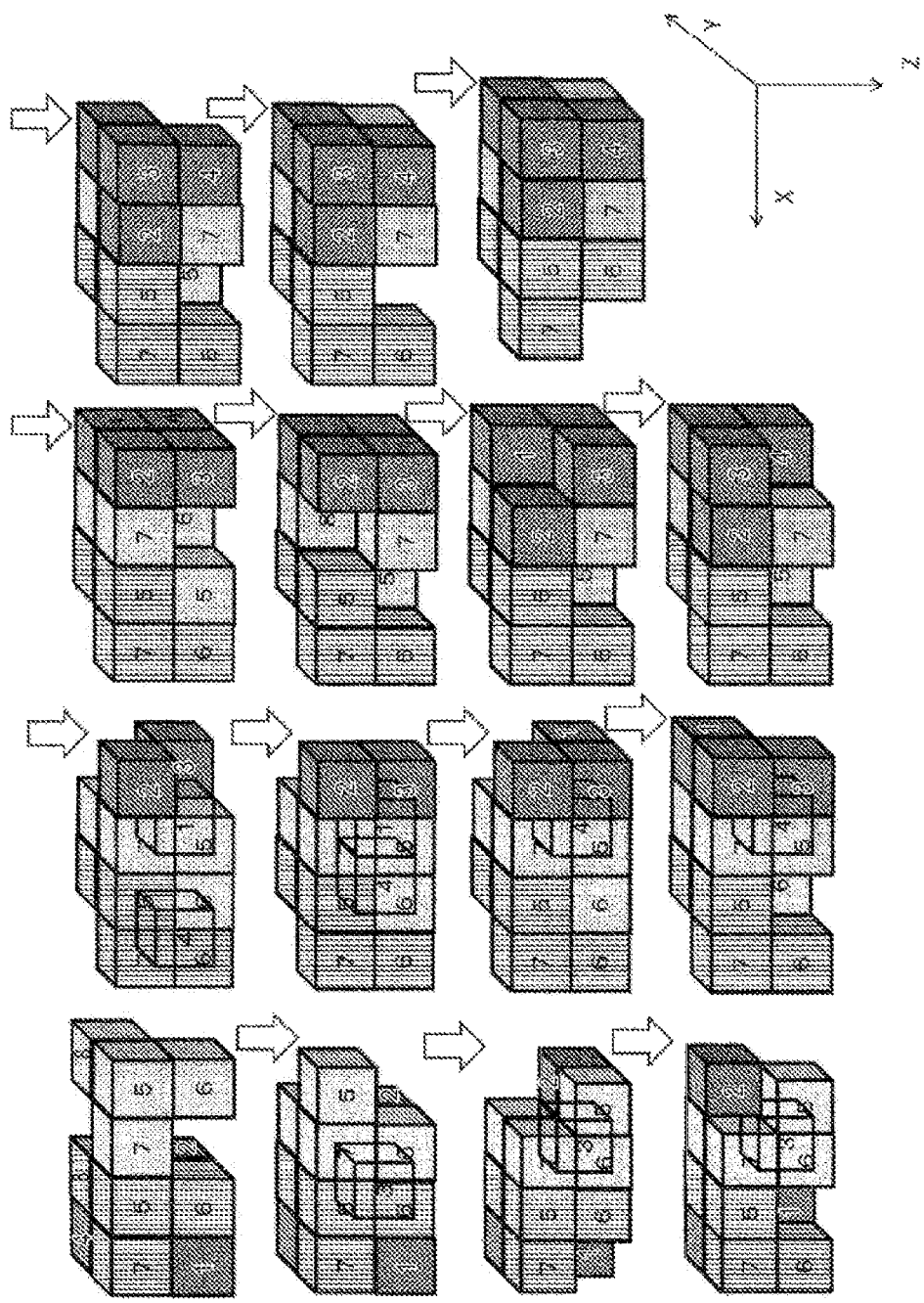
FIG. 12 is a diagram for explaining movement of robot units.

In a case in which robot units that are adjacent to its own target position in directions of a=3, 4, and 6 are present, the fourth moving unit 14 of the robot unit j_k that has received the reply adjacent robot unit checking instruction RETURN_GOAL_NEIGHBOR_COM moves to the position of the adjacent robot unit and moves to the target position using the operation of switching from the position of the destination of the movement (FIG. 11 or FIG. 12). In a case in which robot units that are adjacent to its own target position in the directions of a=3, 4, and 6 are not present, and robot units that are adjacent to its own target position in the directions of a=1, 2, and 5 are present, the fourth moving unit 14 of the robot unit j_k that has received the reply adjacent robot unit checking instruction RETURN_GOAL_NEIGHBOR_COM moves to the position of the adjacent robot unit and moves to the target position using an operation of switching from the position of the destination of the movement (FIG. 12).

The fourth moving unit 14 causes the robot unit itself to move to the adjacent position to which the robot unit is about to move in this manner, for example.

Fifth Moving Unit 15

In a case in which the robot unit is the different robot unit at the position to which the robot unit j_k is about to move, the fifth moving unit 15 causes the different robot unit to move in accordance with the target position of the different robot unit and the path of the different robot unit after the robot unit j_k moves to the position to which the robot unit j_k is about to move through the switching operation (Step S15).

In other words, the different robot unit switched by the robot unit j_k restarts moving to its own target position thereafter.

Waiting Instruction Transmission Unit 16

In a case in which the robot unit is a different robot unit, the waiting instruction transmission unit 16 transmits a waiting instruction including a predetermined waiting time to an adjacent robot unit (Step S16).

For example, the robot unit j_k receives the adjacent robot unit checking instruction RETURN_GOAL_NEIGHBOR_COM and then sends a waiting instruction WAIT_COM to the following moving robot unit.

Hereinafter, the waiting instruction may be described as a waiting instruction WAIT_COM.

The predetermined waiting time is a time=$\alpha$ required for the robot unit j_k to move from a position adjacent to its own target position to its own target position through the operations illustrated in FIG. 11 or FIG. 12, for example. $\beta$ is a predetermined time that is equal to or greater than 0.

Waiting Instruction Transfer Unit 17

In a case in which the robot unit has received the waiting instruction, the waiting instruction transfer unit 17 stops moving of the robot unit itself for a waiting time included in the waiting instruction and transfers, only once, the waiting instruction to the adjacent robot unit (Step S17).

In other words, each moving robot unit that has received the waiting instruction WAIT_COM stops the operation for a time designated by the instruction thereafter. Also, the waiting instruction WAIT_COM is propagated to each robot unit similarly to the instruction MANHATTAN_COM.

In this manner, it is possible to shorten the time required for the platoon control operations by performing the operation of transforming the overall shape and switching of the robot positions after the transformation at the same time rather than performing them in separate processes.

Second Embodiment

Hereinafter, a mobile robot and a control method for the mobile robot according to a second embodiment will be described.

Although the operation of switching the positions of the robot units is performed in the target position G in the first embodiment, the operation can be performed in the initial position S.

In this case, an order in which the moving robot units pass through the connecting position Gate_S and enter the target position G has to be an order from the shortest Manhattan distance of the target position of each robot unit from the connecting position Gate_S. However, when the robot unit j starts moving, the condition that the Manhattan distance of the robot j from the robot unit j_root is greater than that of the robot unit in the initial position S that is adjacent to the robot unit j at the current time has to be satisfied.

Here, the robot unit j_k is assumed to be a robot unit that is to pass through the connecting position Gate_S next at a certain timing. At this time, adjacent robot units are traced such that the Manhattan distance from the robot unit j_k increases, and the robot unit finally reached in S at the timing is assumed to be j_move. First, the robot unit j_move is caused to move to the position of the robot unit j_k. Thereafter, switching of the robot unit j_move and the robot unit j_k is performed through the operations in FIG. 11 or FIG. 12. Thereafter, the robot unit j_k is caused to move to the connecting position Gate_S. Thereafter, the robot unit j_k is moved in the target position G similarly to the case of the first embodiment. Setting of the moving start time of each robot unit is similar to that in the case of the first embodiment.

The second embodiment of the mobile robot that implements the aforementioned method using an algorithm based on a distributed control scheme and a control method for the mobile robot will be described below.

The aforementioned robot operations are implemented by a distributed algorithm for implementing the robot operations using a calculator incorporated in each robot unit and communication among adjacent robots.

Figure 18:
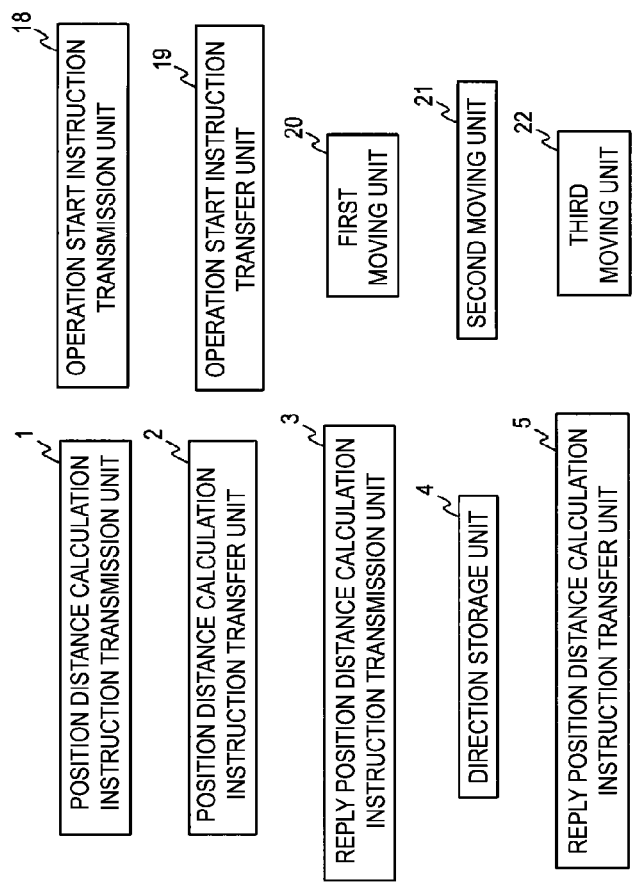
FIG. 18 is a bock diagram for explaining a control apparatus according to a second embodiment.

As illustrated in FIG. 18, the mobile robot includes, for example, a position distance calculation instruction transmission unit 1, a position distance calculation instruction transfer unit 2, a reply position distance calculation instruction transmission unit 3, a direction storage unit 4, a reply position distance calculation instruction transfer unit 5, an operation start instruction transmission unit 18, an operation start instruction transfer unit 19, a first moving unit 20, a second moving unit 21, and a third moving unit 22.

Figure 19:
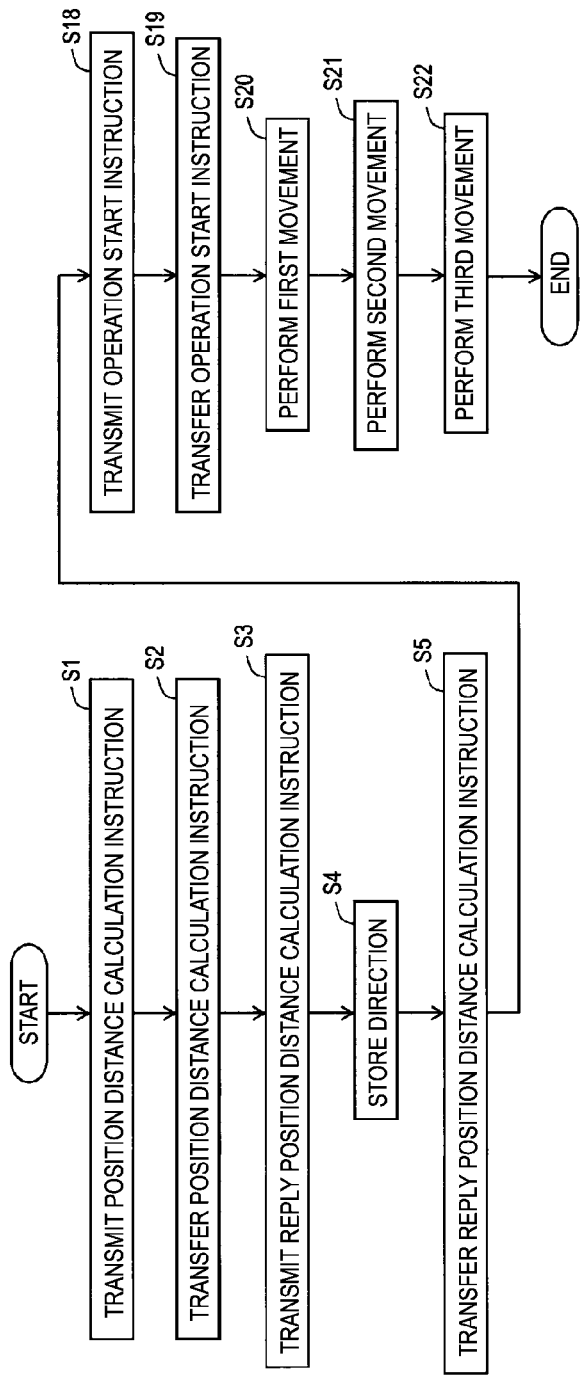
FIG. 19 is a flow diagram for explaining a control method according to the second embodiment.

The control method for the mobile robot is implemented by each part of the mobile robot performing the processing in Step S1 to Step S5 and Step S18 to Step S22 described in FIG. 19 and below, for example.

The processing in Step S1 to Step S5 is processing for recognizing a platoon structure at the initial position S. The processing in Step S18 to Step S22 is processing for moving the robot unit.

Hereinafter, parts that are different from those in the first embodiment will mainly be described. Description of parts similar to those in the first embodiment will be omitted.

First, the processing in Step S1 to Step S5 performed by the position distance calculation instruction transmission unit 1, the position distance calculation instruction transfer unit 2, the reply position distance calculation instruction transmission unit 3, the direction storage unit 4, and the reply position distance calculation instruction transfer unit 5 is performed similarly to the first embodiment.

Operation Start Instruction Transmission Unit 18

In a case in which the robot unit is the robot unit j_root, and the reply position distance calculation instructions that all the robots have transmitted have been received, the operation start instruction transmission unit 18 determines a clock time at which each robot unit starts moving based on the position of each robot unit based on the relative position included in the reply position distance calculation instruction. The robot units are defined as k=1, . . . , K from the shortest Manhattan distance from Gate_S at the target position in G, and the robot unit j_k entering G is determined in order from smallest k. The robot unit j_move that is located at a location that can be traced from the robot unit j_k and is in the position with the longest Manhattan distance from the connecting position is selected, and an operation start instruction including the position of the robot unit j_move and path information from the position of the robot unit j_move to the position of the robot unit j_k, for determining the movement start clock time of the robot unit j_move depending on the Manhattan distance from Gate_S of the robot unit j_move is transmitted to an adjacent robot unit (Step S18).

Unlike the operation clock time announcement instruction transmission unit 6 in the first embodiment, the operation start instruction transmission unit 18 sets the robot movement start clock time at the robot unit j_root in consideration of the switching of the robot positions in the initial position S as described above.

For example, the first operation start instruction START_MOVE_COM includes the robot unit j_1 that is to pass through Gate_S first, the furthest robot unit j_move that is located at a location that can be traced in a direction in which the Manhattan distance increases from the robot unit j_1, and path information from the robot unit j_move to the robot unit j_1.

The operation start instruction transmission unit 18 of the robot unit j_root transmits the second operation start instruction START_MOVE_COM after a predetermined time (a movement start time interval determined by the Manhattan distance δ from Gate_S of the robot unit j_move+a waiting time for switching positions) elapses from the transmission of the first operation start instruction START_MOVE_COM. The second operation start instruction START_MOVE_COM includes the robot unit j_2 that is to pass through the connecting position Gate_S second, the furthest robot unit j_move that is located at a location that can be traced in a direction in which the Manhattan distance increases from the robot unit j_2, and path information from the robot unit j_move to the robot unit j_2.

In this manner, the operation start instruction transmission unit 18 transmits the operation start instruction START_MOVE_COM corresponding to each robot unit j_k (k=1, . . . , K) at predetermined time intervals.

Operation Start Instruction Transfer Unit 19

In a case in which the robot unit has received the operation start instruction, the operation start instruction transfer unit 19 transfers, only once, the operation start instruction to an adjacent robot unit (Step S19).

In this manner, the operation start instruction START_MOVE_COM is propagated to each robot unit similarly to the position distance calculation instruction MANHATTAN_COM.

First Moving Unit 20

In a case in which the robot unit is the robot unit j_move and has received the operation start instruction, the first moving unit 20 causes the robot unit j_move to move to the position of the robot unit j_k (Step S20).

The first moving unit 20 of the robot unit j_move that has received the first operation start instruction START_MOVE_COM causes the robot unit j_move to move to the position of the robot unit j_1.

An example of the operation of switching the positions of the robot unit j_move and the robot unit j_k is as follows. If the robot unit j_move has reached a position at which the robot unit j_move composes the eight-cell robot unit with the robot unit j_k, with which the robot unit j_move itself is switched, then the first moving unit 20 of the robot unit j_move transmits an adjacent robot unit checking instruction ASK_GOAL_NEIGHBOR_COM for asking information whether a robot unit that is adjacent to the robot unit j_k is present, to the robot unit j_k. The robot unit j_k replies with a reply adjacent robot unit checking instruction RETURN_GOAL_NEIGHBOR_COM for replying with information related to whether a robot unit adjacent to the robot unit j_k itself is present.

In a case in which robot units that are adjacent to the robot unit j_k in the directions of a=3, 4, and 6 are present, the first moving unit 20 of the robot unit j_move that has received the reply adjacent robot unit checking instruction RETURN_GOAL_NEIGHBOR_COM moves to the position of the adjacent robot unit and then moves to the position of the robot unit j_k using the operation of switching from the position of the destination of the movement (FIG. 11). In a case in which robot units that are adjacent to the robot unit j_k in the directions of a=3, 4, and 6 are not present, and robot units that are adjacent to the robot unit j_k in the directions of a=1, 2, and 5 are present, the first moving unit 20 of the robot unit j_move that has received the reply adjacent robot unit checking instruction RETURN_GOAL_NEIGHBOR_COM moves to the position of the adjacent robot unit and then moves to the position of the robot unit j_k using the operation of switching from the position of the destination of the movement (FIG. 12).

Second Moving Unit 21

In a case in which the robot unit is the robot unit j_k, the second moving unit 21 causes the robot unit j_k to move toward the connecting position after the robot unit j_move moves to the position of the robot unit j_k through the switching (Step S21).

In this manner, the robot unit j_move moves to the position of the robot unit j_1 and is then switched with the robot unit j_1, and the robot unit j_1 after the switching starts moving to the connecting position Gate_S, for example.

Note that each robot unit j_k (k=1, 2, 3, . . . , p/4) that has started moving first moves in the root direction through the operation illustrated in FIG. 9 or FIG. 10, for example. Thereafter, each robot unit transmits an instruction ASK_TO_ROOT_COM for asking the root direction to a robot unit that composes the eight-cell robot unit together with the robot unit itself and knows the root direction through the reply instruction RETURN_TO_ROOT in response to the instruction ASK_TO_ROOT_COM, for example. Then, the robot unit moves in the root direction (using the operation in FIG. 9 or 10). Thereafter, the robot unit j_k repeats this until reaching the position (connecting position Gate_S) of the robot unit j_root.

Third Moving Unit 22

In a case in which the robot unit reaches the connecting position, the third moving unit 22 acquires the target position of the robot unit itself and a path to reach the target position of the robot unit itself from the robot unit j_root and causes the robot unit itself to move in accordance with the acquired target position and the path (Step S22).

For example, the third moving unit 22 of each robot unit j_k that has reached the connecting position Gate_S transmits, to the robot unit j_root, an instruction REQUEST_PATH_TO_GOAL_COM for requesting information of the target position of itself in G and an optimal path to get to the target position (on the assumption that all the robot unit positions in G to get to the target position are filled). The third moving unit 22 receives a reply instruction RETURN_PATH_TO_GOAL_COM from the robot unit j_root in response to the instruction REQUEST_PATH_TO_GOAL_COM and then starts moving to the target position of itself in G in accordance with the received path information.

In this manner, it is possible to shorten the time required for the platoon control operations by performing the operation of transforming the overall shape and switching of the robot positions after the transformation at the same time rather than performing them in separate processes.

Third Embodiment

Hereinafter, a mobile robot and a control method for the mobile robot according to a third embodiment will be described.

Introduction of Eight-Cell Robot Unit

Figure 15:
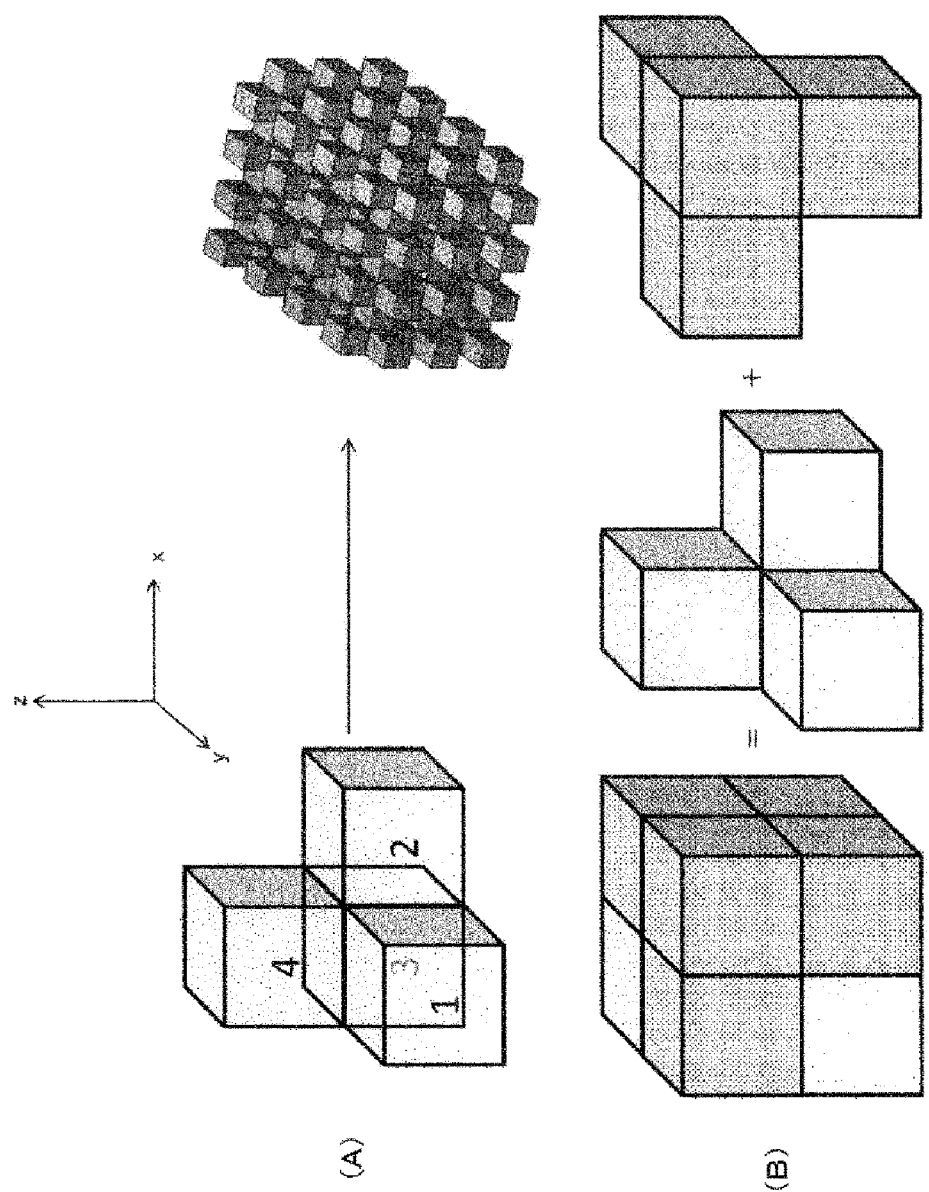
FIG. 15 is a diagram for explaining an example of robot units.

A robot unit composed of four robots has been handled as one cell unit, and a four-cell unit to be paired with this to compose an eight-cell robot unit will be defined (FIG. 15). When the position of a certain robot unit j is assumed to be $(Xr\_u[j], Yr\_u[j], Zr\_u[j])$, here (j=0, 1, 2, . . . j_max−1), and robots in the robot unit j are assumed to be j1, j2, j3, and j4, the following can be expressed.

$Xr[j1]=2 \times Xr\_u[j]$ $Yr[j1]=2 \times Yr\_u[j]+1$ $Zr[j1]=2 \times Zr\_u[j]+1$ $Xr[j2]=2 \times Xr\_u[j]+1$ $Yr[j2]=2 \times Yr\_u[j]$ $Zr[j2]=2 \times Zr\_u[j]+1$ $Xr[j3]=2 \times Xr\_u[j]+1$ $Yr[j3]=2 \times Yr\_u[j]+1$ $Zr[j3]=2 \times Zr\_u[j]$ $Xr[j4]=2 \times Xr\_u[j]+1$ $Yr[j4]=2 \times Yr\_u[j]+1$ $Zr[j4]=2 \times Zr\_u[j]+1$ Note that the robot unit j to which each robot i belongs is not variable at any clock time in the platoon control. Also, the initial position of each robot unit j is assumed to be $(Xr\_u0[j], Yr\_u0[j], Zr\_u0[j])$, and the target position is assumed to be $(Xr\_ue[j], Yr\_ue[j], Zr\_ue[j])$.

It is possible to transform the robot platoon composed of the eight-cell robot unit into any platoon using a combination of the first embodiment and the second embodiment. The four-cell robot unit represented by dots in FIG. 15(B) is caused to move into the target position G by the method of the first embodiment first and then aligned in the four-cell robot unit form represented in a white color in FIG. 15(B). Next, the four-cell robot unit represented in the white color is caused to move into the target position G by the method of the second embodiment body.

However, this embodiment is different from the first embodiment and the second embodiment only in that the robot units are caused to move to the target position G with higher priority from the one located at the closest Manhattan distance from the connecting position Gate_S in the first movement in the four-cell robot unit represented by the dots, and in the subsequent movement of the four-cell robot unit represented in the white color, the robot units pass through the connecting position Gate_S in order from the longest Manhattan distance from the connecting position Gate_S in the target position G. Other points are similar to those in the first embodiment and the second embodiment.

Figure 20:
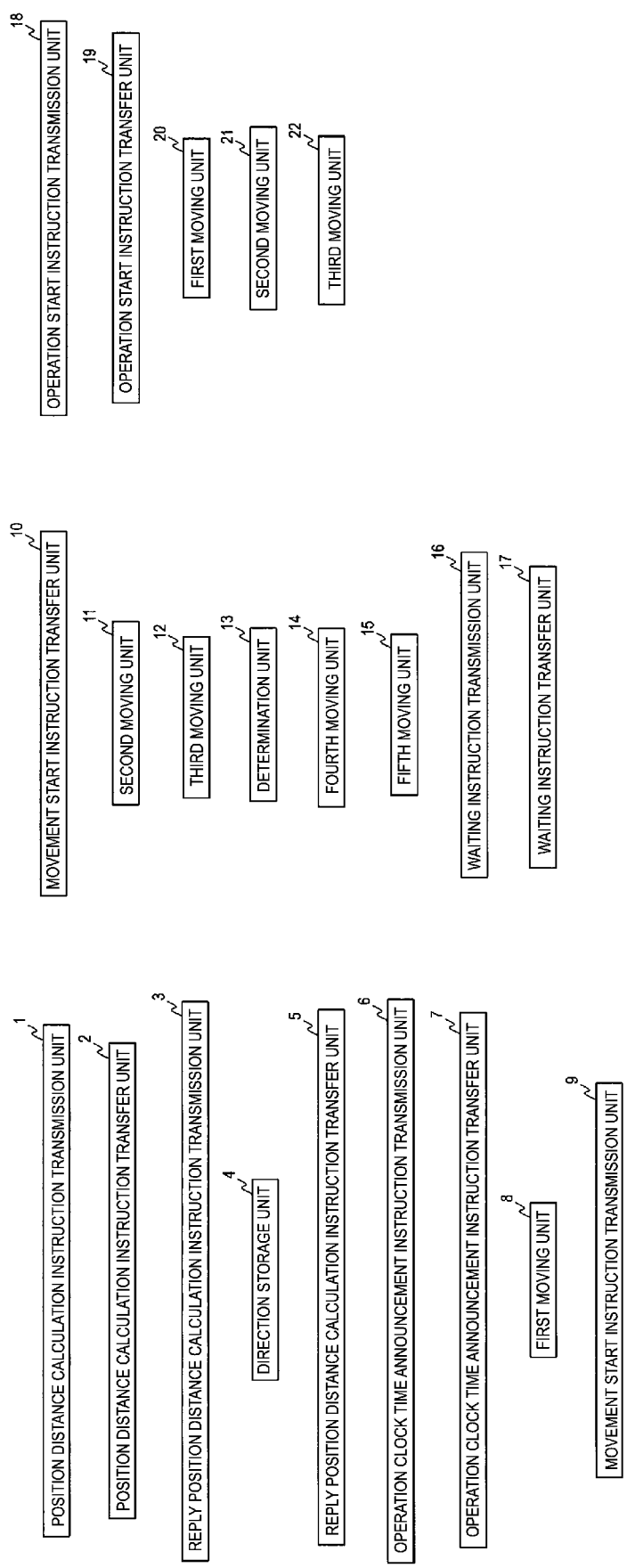
FIG. 20 is a block diagram for explaining a control apparatus according to a third embodiment.

As illustrated in FIG. 20, the mobile robot according to the third embodiment includes, for example, a position distance calculation instruction transmission unit 1, a position distance calculation instruction transfer unit 2, a reply position distance calculation instruction transmission unit 3, a direction storage unit 4, a reply position distance calculation instruction transfer unit 5, an operation clock time announcement instruction transmission unit 6, an operation clock time announcement instruction transfer unit 7, a first moving unit 8, a movement start instruction transmission unit 9, a movement start instruction transfer unit 10, a second moving unit 11, a third moving unit 12, a determination unit 13, a fourth moving unit 14, a fifth moving unit 15, a waiting instruction transmission unit 16, a waiting instruction transfer unit 17 an operation start instruction transmission unit 18, an operation start instruction transfer unit 19, a first moving unit 20, a second moving unit 21, a the third moving unit 22.

Figure 21:
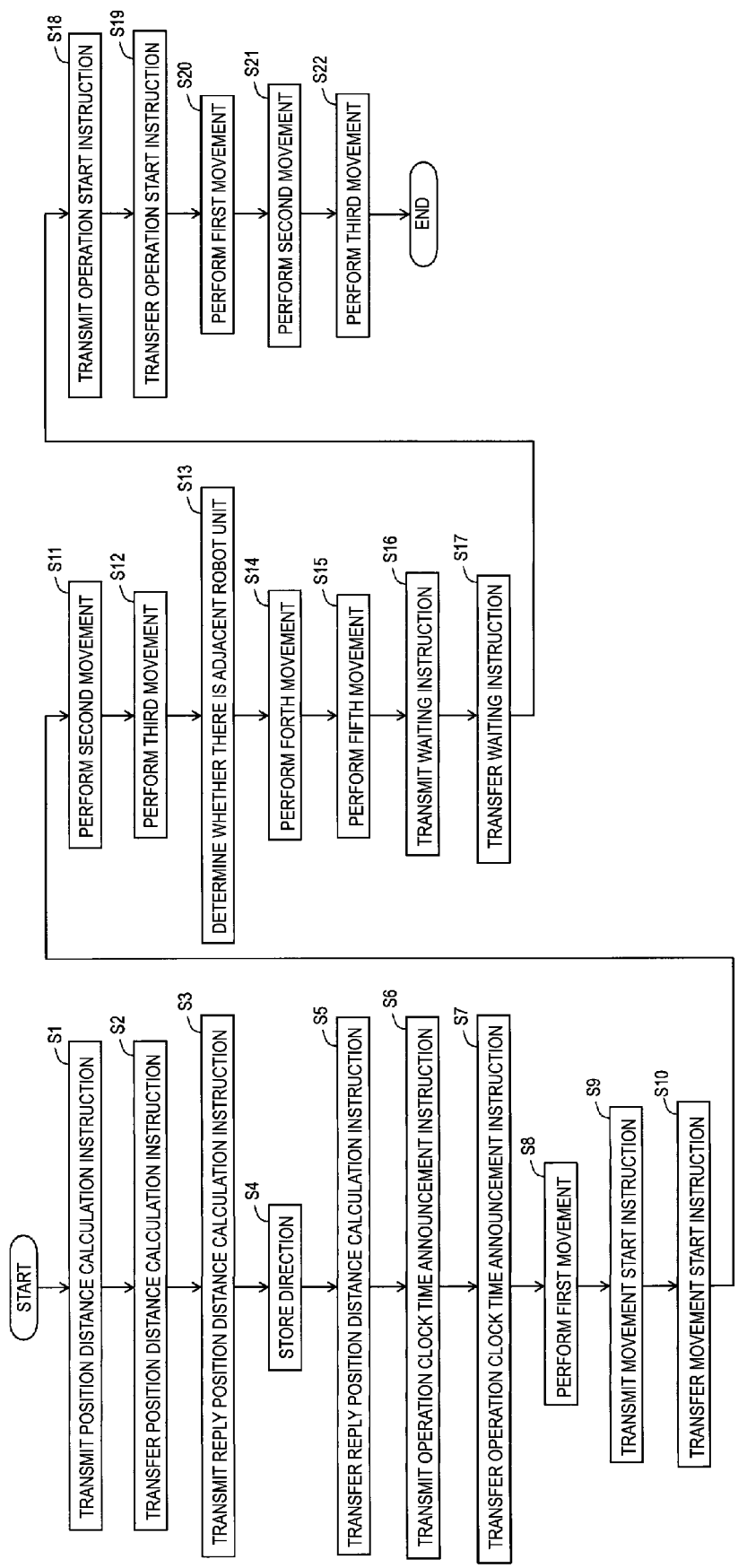
FIG. 21 is a flow diagram for explaining a control method according to the third embodiment.

The control method for the mobile robot is implemented by each part of the mobile robot performing processing in Step S1 to Step S22 described in FIG. 21 and below, for example.

Hereinafter, parts that are different from those in the first embodiment and the second embodiment will mainly be described. Description of parts that are similar to those in the first embodiment and the second embodiment will be omitted.

First, the processing in Step S1 to Step S17 is performed by the position distance calculation instruction transmission unit 1, the position distance calculation instruction transfer unit 2, the reply position distance calculation instruction transmission unit 3, the direction storage unit 4 and the reply position distance calculation instruction transfer unit 5, the operation clock time announcement instruction transmission unit 6, the operation clock time announcement instruction transfer unit 7, the first moving unit 8, the movement start instruction transmission unit 9, the movement start instruction transfer unit 10, the second moving unit 11, the third moving unit 12, the determination unit 13, the fourth moving unit 14, the fifth moving unit 15, the waiting instruction transmission unit 16, and the waiting instruction transfer unit 17 similarly to the first embodiment.

However, the operation clock time announcement instruction transmission unit 6 determines the movement start clock time of each robot unit such that the robot unit at the closer Manhattan distance from the connecting position Gate_S starts moving to the target position G with higher priority (Step S6).

Also, the four-cell robot unit represented by the dots in FIG. 15(B) is assumed to be positioned at the position of the four-cell robot unit represented in the white color in FIG. 15(B) at the target position G.

Thereafter, the processing in Step S1 to Step S5 and in Step S18 to Step S22 is performed by the position distance calculation instruction transmission unit 1, the position distance calculation instruction transfer unit 2, the reply position distance calculation instruction transmission unit 3, the direction storage unit 4, the reply position distance calculation instruction transfer unit 5, the operation start instruction transmission unit 18, the operation start instruction transfer unit 19, the first moving unit 20, the second moving unit 21, and the third moving unit 22 similarly to the second embodiment.

However, the operation start instruction transmission unit 18 determines the movement start clock time of each robot unit such that the robot units pass through the connecting position Gate_S in order from the longest Manhattan distance from the connecting position Gate_S in the target position G (Step S18).

Note that the second processing in Step S1 to Step S5 performed by the position distance calculation instruction transmission unit 1, the position distance calculation instruction transfer unit 2, the reply position distance calculation instruction transmission unit 3, the direction storage unit 4, and the reply position distance calculation instruction transfer unit 5 may not be performed. In this case, processing in Step S18 to Step S22 is performed by the operation start instruction transmission unit 18, the operation start instruction transfer unit 19, the first moving unit 20, the second moving unit 21, and the third moving unit 22 similarly to the second embodiment, using a result of the first processing in Step S1 to Step S5 performed by the position distance calculation instruction transmission unit 1, the position distance calculation instruction transfer unit 2, the reply position distance calculation instruction transmission unit 3, the direction storage unit 4, and the reply position distance calculation instruction transfer unit 5.

According to the third embodiment as well, it is possible to shorten the time required for the platoon control operations by performing the operation of transforming the overall shape and switching the robot positions after the transformation at the same time rather than performing them in separate processes.

Program and Recording Medium

In a case in which the processing performed by each part in the mobile robot is implemented by a computer, details of the processing performed by functions that each part of the apparatus has to include are described as a program. Then, the processing of each part is implemented on the computer by the computer executing the program.

A program describing the processing content can be recorded on a computer-readable recording medium. As the computer-readable recording medium, for example, any recording medium such as a magnetic recording apparatus, an optical disk, a magneto-optical recording medium, and a semiconductor memory may be used.

The processing of each part may be composed by causing the computer to execute a predetermined program on the computer, or at least a part of the processing may be implemented in the form of hardware.

It is needless to say that the present disclosure can appropriately be modified without departing from the gist of the present disclosure.

REFERENCE SIGNS LIST

1 Position distance calculation instruction transmission unit
2 Position distance calculation instruction transfer unit
3 Reply position distance calculation instruction transmission unit
4 Direction storage unit
5 Reply position distance calculation instruction transfer unit 6 Operation clock time announcement instruction transmission unit
7 Operation clock time announcement instruction transfer unit
8 First moving unit
9 Movement start instruction transmission unit
10 Movement start instruction transfer unit
11 Second moving unit
12 Third moving unit
13 Determination unit
14 Fourth moving unit
15 Fifth moving unit
16 Instruction transmission unit
17 Instruction transfer unit
18 Operation start instruction transmission unit
19 Operation start instruction transfer unit
20 First moving unit
21 Second moving unit
22 Third moving unit

The invention claimed is:
1. A mobile robot set comprising:
a plurality of robots,
wherein the plurality of robots forms a gap around one or more robots of the plurality of robots, the mobile robot set moves using the gap,
a first robot of the plurality of robots is associated with a predetermined initial position and a predetermined target position,
the predetermined initial position and the predetermined target position are in contact at a connecting position,
the first robot is for moving from the predetermined initial position to the predetermined target position through the connecting position, and
the first robot is located at the connecting position, and a processor configured to execute operations comprising:
transmitting, by the first robot to a second robot of the plurality of robots, a position distance calculation instruction,
wherein at least a part of the second robot is in contact with to the first robot as being adjacent to each other, the position distance calculation instruction includes predetermined values of a relative position from the connecting position and a number of transmissions and transfers;
when the second robot receives the position distance calculation instruction:
incrementing, by the second robot, the number of transmissions and transfers in the received position distance calculation instruction;
updating, by the second robot, the relative position in the position distance calculation instruction in accordance with a direction from which the position distance calculation instruction is received;
transferring, the updated relative position and the position distance calculation instruction to a third robot of the plurality of robots;
storing, by the second robot, as a root direction, a direction of the first robot;
receiving, by the first robot, a reply position distance calculation instruction from the second robot, wherein the reply position distance calculation instruction includes the incremented number of transmissions and transfers and the updated relative position;
determining, by the first robot, a movement start clock time for each of the plurality of robots based on a position of each of the plurality of robots according to at least the relative position in the reply position distance calculation instruction; and
transmitting, by the first robot, an operation clock time announcement instruction to the second robot, wherein the operation clock time announcement instruction includes the movement start clock time;
transferring the operation clock time announcement instruction to the third robot;
when a predetermined time elapses after a start of the moving by the first robot, transmitting, by the first robot, a movement start instruction to the second robot;
transferring, by the second robot the movement start instruction to the third robot;
acquiring, by the first robot reaching the connecting position, a target position of the first robot and a path to reach the target position of the first robot from the connecting position;
moving, by the first robot, to the acquired target position according to the path to reach the target position of the first robot;
determining, by the first robot, whether there is the second robot at an adjacent position to which the first robot is about to move next;
when there is the second robot at the adjacent position to which the first robot is about to move and when the adjacent position to which the first robot is about to move is the target position of the first robot, moving, by the first robot, to the adjacent position;
subsequent to the moving by the first robot to the adjacent position, moving, by the second robot, in accordance with a target position of the second robot and a path of the second robot;
transmitting, by the second robot, a waiting instruction, wherein the waiting instruction includes a predetermined waiting time to the third robot; and
causing the third robot to stop movement for the predetermined waiting time and to transfer, by the third robot, the waiting instruction to an adjacent robot.
2. The mobile robot set according to claim 1, wherein
the first robot represents a partial structure of the mobile robot set, the first robot occupies a space with a cube shape, the first robot has a number of unit lengths in each axial direction in a three-dimensional orthogonal coordinate system,
a number of robot parts of the first robot is equal to a number of parts of the cube shape other than occupied by the robot parts of the first robot, and
the first robot includes a structure in which a number of robot parts that are adjacent to each other in each axial direction is same as the number of unit lengths.
3. The mobile robot set according to claim 1, wherein a number of the plurality of robots is a multiple of four.
4. A mobile robot set comprising:
a plurality of robots,
wherein the plurality of robots forms a gap around one or more robots of the plurality of robots, the mobile robot set moves using the gap,
a first robot of the plurality of robots is associated with a predetermined initial position and a predetermined target position, the predetermined initial position and the predetermined target position are in contact at a connecting position,
the first robot is for moving from the predetermined initial position to the predetermined target position through the connecting position, the first robot is located from the connecting position; and
a processor configured to execute operations comprising:
transmitting, by the first robot to a second robot of the plurality of robots, a position distance calculation instruction,
wherein at least a part of the second robot is in contact with the first robot as being adjacent to each other, the position distance calculation instruction includes a relative position from the connecting position and number of transmissions and transfers;
when the second robot receives the position distance calculation instruction:
incrementing, by the second robot, the number of transmissions and transfers in the received position distance calculation instruction;
updating, by the second robot, the relative position in the position distance calculation instruction in accordance with a direction from which the position distance calculation instruction is received;
transferring the updated relative position and the position distance calculation instruction to a third robot of the plurality of robots;
storing, by the second robot, as a root direction, a direction of the first robot;
receiving, by the first robot, a reply position distance calculation instruction from the second robot, wherein the reply position distance calculation instruction includes the incremented number of transmissions and transfers the updated relative position;
determining, by the first robot, a movement start clock time for each of the plurality of robots based on a position of each of the plurality of robots according to at least the relative position in the reply position distance calculation instruction;
transmitting, by the first robot, an operation start instruction to a fourth robot wherein the fourth robot is located at a location that is traceable from the first robot and is in a position with the longest Manhattan distance from the connecting position, and path information from a position of the first robot to a position of the fourth robot;
transferring the operation start instruction to the third robot;
causing, the fourth robot to move toward the connecting position after the first robot moves to the position of the fourth robot; and
when the fourth robot reaches the connecting position:
acquiring, by the fourth robot, a target position and a path to reach the target position from the first robot from the connecting position; and
causing the fourth robot to move in accordance with the acquired target position and the acquired path.

5. The mobile robot set according to claim 4, wherein a number of the plurality of robots is a multiple of four.

6. The mobile robot set according to claim 4, wherein the first robot represents a partial structure of the mobile robot set, the first robot occupies a space with a cube shape, the first robot has a number of unit lengths in each axial direction in a three-dimensional orthogonal coordinate system,
a number of robot parts associated with the first robot is equal to a number of parts of the cube shape other than occupied by the robot parts of the first robot, and
the first robot includes a structure in which a number of robot parts that are adjacent to each other in each axial direction is the same as the number of unit lengths.

7. A computer implemented method for moving a mobile robot set, comprising:
transmitting, from a first robot of a plurality of robots to a second robot of the plurality of robots, a position distance calculation instruction,
wherein the first robot is a part of the mobile robot set, the mobile robot set comprises the plurality of robots,
the plurality of robots forms a gap around one or more robots of the plurality of robots, the mobile robot set moves using the gap,
the first robot of the plurality of robots is associated with a predetermined initial position and a predetermined target position,
the predetermined initial position and the predetermined target position are in contact at a connecting position,
the first robot is for moving from the predetermined initial position to the predetermined target position through the connecting position,
the first robot is located at the connecting position,
the position distance calculation instruction includes a relative position from the connecting position and number of transmissions and transfers;
incrementing, by the second robot of the plurality of robots, the number of transmissions and transfers in the received position distance calculation instruction;
updating, by the second robot, the relative position in the position distance calculation instruction in accordance with a direction from which the position distance calculation instruction is received by the second robot;
transferring, by the second robot, the position distance calculation instruction to a third robot of the plurality of robots;
storing, by the second robot, as a root direction, a direction of the first robot transmitting the position distance calculation instruction;
receiving, by the first robot, a reply position distance calculation instruction from the second robot, wherein the reply position distance calculation instruction includes the incremented number of transmissions and transfers and the updated relative position;
determining a movement start clock time for each of the plurality of robots based on a position of each of the plurality of robots according to at least the relative position in the reply position distance calculation instruction; and
transmitting an operation clock time announcement instruction including the movement start clock time to the second robot;
transferring, the operation clock time announcement instruction to the third robot;
transmitting, by the first robot, when a predetermined time elapses after a start of the moving by the first robot, a movement start instruction to the second robot;
transferring, by the second robot the movement start instruction to the third robot;

acquiring, by the first robot reaching the connecting position, a target position of the first robot and a path to reach the target position of the first robot from the connecting position;

moving, by the first robot, to the acquired target position according to the path to reach the target position of the first robot;

determining, by the first robot, whether there is the second robot at an adjacent position to which the first robot is about to move next;

when there is the second robot at the adjacent position to which the first robot is about to move and when the adjacent position to which the first robot is about to move to is the target position of the first robot, moving, by the first robot, to the adjacent position;

subsequent to the moving by the first robot to the adjacent position, moving, by the second robot, in accordance with a target position of the second robot and a path of the second robot;

transmitting, by the second robot, a waiting instruction, wherein the waiting instruction includes a predetermined waiting time to the third robot; and causing the third robot to stop movement for the predetermined waiting time and to transfer, by the third robot the waiting instruction to an adjacent robot.

8. The computer implemented method according to claim 7, wherein a number of the plurality of robots is a multiple of four.

9. The computer implemented method according to claim 7, wherein the first robot represents a partial structure of the mobile robot set, the first robot occupies a space with a cube shape, the first robot has a number of unit lengths in each axial direction in a three-dimensional orthogonal coordinate system, a number of robot parts associated with the first robot is equal to number of parts of the cube shape other than occupied by the robot parts of the first robot, and the first robot includes a structure in which a number of robot parts that are adjacent to each other in each axial direction is same as the number of unit lengths.

\* \* \* \* \*